(12) United States Patent
Balaram et al.

(10) Patent No.: US 11,086,644 B1
(45) Date of Patent: Aug. 10, 2021

(54) INTERFACE AND MODE SELECTION FOR DIGITAL ACTION EXECUTION

(71) Applicant: GOOGLE LLC, Mountain View, CA (US)

(72) Inventors: Prithvi Balaram, Mountain View, CA (US); Nikhil Rao, Mountain View, CA (US); Ian Baker, Mountain View, CA (US); Adam Coimbra, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/816,794

(22) Filed: Mar. 12, 2020

Related U.S. Application Data

(63) Continuation of application No. 16/643,648, filed as application No. PCT/US2020/020341 on Feb. 28, 2020.

(51) Int. Cl.
*G06F 3/16* (2006.01)
*G06F 9/451* (2018.01)
*G06F 16/245* (2019.01)

(52) U.S. Cl.
CPC .............. *G06F 9/453* (2018.02); *G06F 3/167* (2013.01); *G06F 16/245* (2019.01)

(58) Field of Classification Search
CPC ......... G06F 9/453; G06F 16/245; G06F 3/167
See application file for complete search history.

(56) References Cited

U.S. PATENT DOCUMENTS

| 8,626,511 B2 * | 1/2014 | LeBeau | G10L 15/30 |
| | | | 704/270 |
| 2004/0170875 A1 * | 9/2004 | Ozeki | H01M 8/04567 |
| | | | 429/430 |
| 2011/0238731 A1 | 9/2011 | Corson | |

(Continued)

FOREIGN PATENT DOCUMENTS

WO WO-2019/216980 A1 11/2019

OTHER PUBLICATIONS

Emily Siegel, "5 apps to turn your smartphone into a personal assistant", published on Dec. 16, 2014 to https://mashable.com/2014/12/16/smartphone-personal-assistant/, retrieved Jan. 16, 2021 (Year: 2014).*

(Continued)

*Primary Examiner* — Shourjo Dasgupta
(74) *Attorney, Agent, or Firm* — Foley & Lardner LLP

(57) ABSTRACT

Interface and mode selection for digital action execution is provided. For example, a system loads a script library embedded in an electronic resource. The system determines a historic level of engagement between a client computing device and one or more digital assistants. The system selects, based on a first property of the client computing device and the historic level of engagement, a type of digital interface. The system generates, based on the type of digital interface, a digital interface with the call-to-action. The system determines, responsive to an instruction to execute the call-to-action, a mode of execution. The system selects a digital assistant and a second client device to execute the call-to-action. The system transmits the call-to-action to the second client device for execution.

20 Claims, 7 Drawing Sheets

(56) References Cited

U.S. PATENT DOCUMENTS

| | | | | |
|---|---|---|---|---|
| 2016/0080815 A1* | 3/2016 | Ruffini | ............... | H04N 21/4622 |
| | | | | 725/46 |
| 2016/0345044 A1* | 11/2016 | Klappert | ............ | H04N 21/4882 |
| 2017/0257456 A1* | 9/2017 | Vaish | ....................... | H04L 67/42 |
| 2019/0102482 A1* | 4/2019 | Ni | ........................... | G06N 3/006 |
| 2019/0354252 A1* | 11/2019 | Badr | ....................... | G06F 3/167 |

OTHER PUBLICATIONS

International Search Report for PCT Appln. Ser. No. PCT/US2020/020341 dated May 11, 2020 (4 pages).

* cited by examiner

INTERFACE AND MODE SELECTION FOR DIGITAL ACTION EXECUTION

CROSS-REFERENCES TO RELATED APPLICATIONS

This application claims the benefit of priority under 35 U.S.C. § 120 as a continuation of Ser. No. 16/643,648, filed Mar. 2, 2020, which is a U.S. National Stage under 35 U.S.C. § 371 of International Patent Application No. PCT/US20/20341, filed Feb. 28, 2020 and designating the United States, each of which is hereby incorporated by reference herein in its entirety.

BACKGROUND

A computing device can execute an application. The application can provide a user interface that can receive input information, perform a function, and output information.

SUMMARY

This technical solution is generally directed to selecting a type of interface and mode for executing digital actions. The technical solution can adjust the interface or mode based on a type of device and historical engagement level between a device and a digital assistant. For example, different types of interfaces or modes of execution can utilize different amounts of computation resources, energy or power resources, network bandwidth resources, display resources, sensor resources, or time. Thus, it can be inefficient to select an interface that consumes excessive resources relative to a resource that utilizes fewer resources. However, certain resources may not be compatible with certain types of devices, or may otherwise be inefficient to execute in a particular computing environment, thereby resulting in a potentially more efficient interface ultimately consuming excessive resources in order to complete execution of a digital action. Therefore, systems and methods of the present technical solution can select a type of interface or mode of execution of digital actions in order to reduce excessive resource consumption, thereby improving the efficiency in which a computing environment executes a digital action.

At least one aspect of the present technical solution is directed to a system to adjust execution of digital actions. The system can include a data processing system including one or more processors. The data processing system can load a script library embedded in an electronic resource. The data processing system can load the script library via a client computing device. The client device can be one of multiple client computing devices linked to an electronic account. The script library can include one or more call-to-actions for the electronic resource that are configured for execution by one or more digital assistants provided by each of the client computing devices. The data processing system can query a digital assistant component to determine a historic level of engagement between the client computing devices and the one or more digital assistants. The data processing system can select, based on a first property of the client computing device and the historic level of engagement, a type of digital interface in which to present a call-to-action of the plurality of call-to-actions. The data processing system can generate, based on the type of digital interface selected based on the first property of the client computing device and the historic level of engagement, a digital interface with the call-to-action. The data processing system can detect, via the digital interface, an instruction to execute the call-to-action. The data processing system can determine, responsive to the instruction to execute the call-to-action, a mode of execution for the call-to-action based on a second property of the client computing device and the historic level of engagement. The data processing system can select, based on the mode of execution, a digital assistant from the one or more digital assistants and a second client device of the plurality of client computing devices to execute the call-to-action. The data processing system can transmit the call-to-action to the second client device to cause the second client device to invoke the digital assistant to execute the call-to-action.

At least one aspect of the present technical solution is directed to a method of adjusting execution of digital actions. The method can be performed by a data processing system including one or more processors. The method can include the data processing system loading, via a client computing device of a plurality of client computing devices linked to an electronic account, a script library embedded in an electronic resource. The script library can include call-to-actions for the electronic resource configured for execution by one or more digital assistants provided by each of the client computing devices. The method can include the data processing system querying a digital assistant component to determine a historic level of engagement between the plurality of client computing devices and the one or more digital assistants. The method can include the data processing system selecting, based on a first property of the client computing device and the historic level of engagement, a type of digital interface in which to present a call-to-action of the plurality of call-to-actions. The method can include the data processing system generating, based on the type of digital interface selected based on the first property of the client computing device and the historic level of engagement, a digital interface with the call-to-action. The method can include the data processing system detecting, via the digital interface, an instruction to execute the call-to-action. The method can include the data processing system determining, responsive to the instruction to execute the call-to-action, a mode of execution for the call-to-action based on a second property of the client computing device and the historic level of engagement. The method can include the data processing system selecting, based on the mode of execution, a digital assistant from the one or more digital assistants and a second client device of the plurality of client computing devices to execute the call-to-action. The method can include the data processing system transmitting the call-to-action to the second client device to cause the second client device to invoke the digital assistant to execute the call-to-action.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
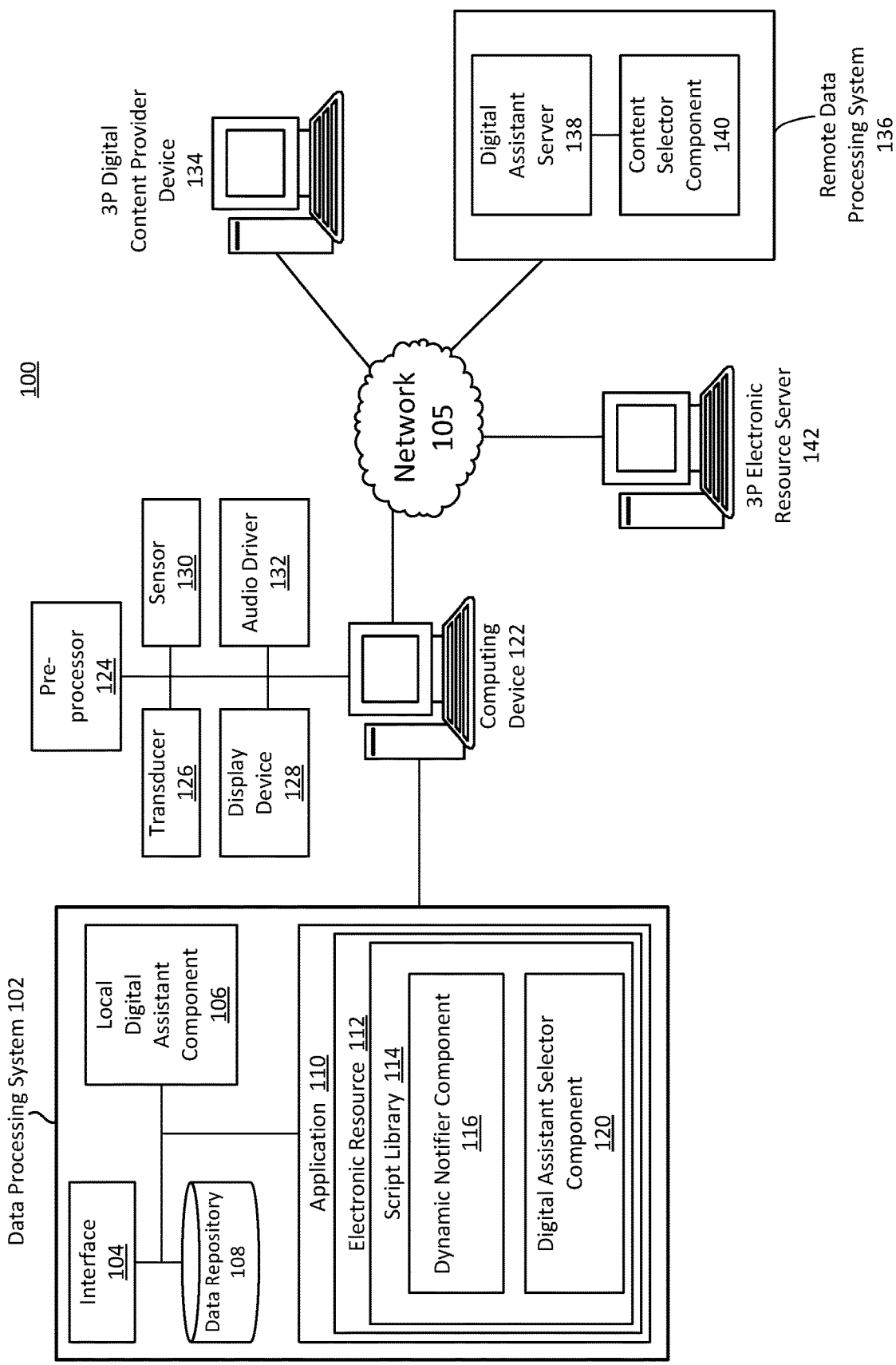
FIG. 1 is an illustration of a system to adjust execution of digital actions, in accordance with an implementation.

Following below are more detailed descriptions of various concepts related to, and implementations of, methods, apparatus, and systems of interface and mode selection for digital action execution. For example, the methods, apparatus, and systems can adjust execution of digital actions. The various concepts introduced above and discussed in greater detail below may be implemented in any of numerous ways.

This technical solution is generally directed to selecting an interface or mode of execution of digital actions. The systems and methods of the technical solution can adjust execution of digital actions by selecting a type of interface or mode of execution for the digital action.

Actions can be linked for execution by a voice-based digital assistant. An action (or function) can refer to or include any type of digital action that can be performed by one or more applications, computing devices, servers, or electronic resources. For third-party ("3P") applications or electronic resources that can interface with a digital assistant, it can be challenging or not possible to efficiently provide a notification of the functions the digital assistant can perform on the application. As the number of types of actions a digital assistant can perform are continually increasing, it can become increasingly challenging and inefficient to discover such functions, let alone properly execute the function at an optimum time or manner in a given context.

For example, a notification can include displaying or playing audio indicating a type of function or action a digital assistant can perform. However, displaying or playing audio listing all the available digital assistant functions with regard to a 3P application can be time consuming, inefficient, introduce delays, and provide a subpar or wasteful user interface as many of those functions may be irrelevant in a current computing environment or context. A system that lacks awareness of the relevant functions a digital assistant can perform on a 3P application or electronic resource can result in the digital assistant or application being underutilized or inefficiently utilized by performing unnecessary or multiple actions that may otherwise be performed by a more efficient digital assistant function. Thus, systems and methods of the present technical solution can select an interface or mode of execution that can improve the efficiency in which an action can be performed (e.g., by selecting a digital assistant function or action).

The present technical solution can facilitate identifying and selecting available and relevant functions that a digital assistant with a voice-based interface can perform on a 3P application, and facilitate execution of the relevant functions. For example, the system can capture available actions or functions a digital assistant can perform on a particular application. The system can identify which actions are relevant to a computing environment context. The system can provide an indication (e.g., a call-to-action) of those relevant actions via a user interface. The system can immediately execute those relevant actions from within the application, linking the call-to-action directly to the relevant action on the digital assistant (e.g., action-linking).

For example, a user can navigate to a website such as an electronic financial instrument trading website. The system can capture or detect the contextual computing information (e.g., actions associated with the website such as logging in, authenticating an account in order to determine a current portfolio value, trade status, or execute a trade or transfer of funds.) The system can identify available actions relevant to the current computing environment that a voice-based digital assistant is configured to perform. The system can provide an indication (e.g., call-to-action) via a user interface directly within the website that provides a notification of the available digital assistant actions relevant to the current computing environment. The system can receive or detect an instruction, command, or interaction with one of the digital assistant actions presented via the notification. The system can provide a digital assistant interface can facilitate execution or invocation of the selected action. Thus, this technical solution identifies and selects relevant actions on a third-party application or electronic resource that a digital assistant can perform more efficiently relative to the actions being performed directly by the 3P application or electronic resource without the digital assistant. The system can discover that the digital assistant is configured to perform one or more actions associated with the application or electronic resource (e.g. website) when the application is invoked, identify which actions are relevant to the current computing environment, display call-to-actions providing notifications of the relevant actions, and then execute the relevant actions.

The system can provide dynamic interface adjustment for call-to-action discovery. For 3P applications or electronic resources that provide functions through a voice interface, it can be challenging or not-possible to efficiently provide a notification of the functions that the application or resource provides in a manner that is non-disruptive to the current non-voice computing interaction with the application or resource. The system can provide a platform-specific action linking mechanism for a voice-based digital assistant. For 3P applications or electronic resources that provide functions through a voice interface, it can be challenging or not possible to allow for efficient invocation of the 3P-provided voice interface functions from the non-voice context in which the user is notified about the functions.

For example, upon discovering the available actions relevant to the current computing environment context, the system can determine what type of call-to-action (notification of available actions) to provide to the user. The system can include a dynamic notifier component that can dynamically determine (e.g., based on a parameter, characteristic or feature associated with a current computing environment) a level of engagement with the application or electronic resource, in order to determine which call-to-actions to display, as well as the format or type of the call-to-action. For example, if a client device is actively interacting with a website to perform certain digital actions, then the dynamic notifier of this technical solution can provide a pop-up window with the discovered call-to-action because the device (or user thereof) may be more likely to engage with a digital assistant to execute the corresponding action. By providing a more conspicuous notification (e.g., relative to an embedded notification or banner notification or small icon located at a corner of the website), the dynamic notifier can increase the likelihood of engaging with the digital assistant to execute the action, thereby preventing the execution of functions via a non-voice-based interface directly with the application that may consume additional computing resources or waste time.

The system can determine that a use of the client device is passively viewing an application or electronic resource. Passively viewing an electronic resource can refer to a non-interactive state or viewing an electronic resource without interacting with the electronic resource. Not interacting with an electronic resource can refer to the client device not receiving input directed to the electronic resource for a duration of time. Examples of applications or electronic resources that can be passively viewed can include music, videos, streaming music, streaming video, or other types of audio or video content that can be viewed or consumed without interaction for a duration. Upon detecting that an electronic resource is being passively viewed, the dynamic notifier can select a different format or type of notification that can be less conspicuous as compared to the type of notification that can be selected for an application or electronic resource that is being actively consumed. Examples of a less conspicuous notification can include an audio or voice overlay, or a small icon positioned in the corner of a display screen or application graphical user interface.

When the system receives an interaction with a call-to-action on a third-party application or electronic resource, the system can perform platform-specific action linking for a voice-based digital assistant. Platform-specific action linking can refer to the system determining an appropriate platform-specific technology for directing or navigating the user to the selected action within the digital assistant. The system can include a digital assistant selector component (e.g., a dynamic device selector) that can dynamically select a device to use to execute the digital action. The system can identify multiple devices that are linked to one another for the purposes of executing a digital action. The device that displayed the notification and received the instruction to execute the call-to-action (e.g., digital action) can be linked to an account that can be associated or linked with multiple devices. One or more of the devices that are linked to the account can be configured to or capable of performing or executing the digital action. The devices linked to the account can be configured with digital assistants. One or more of the devices can be available to execute the action responsive to the instruction or during some other desired time interval. The system can use a selection policy to identify or select a device for executing the digital action. The selection policy can select the device based on a current computing environment or context.

An example of platform-specific action linking can include using a deep link to launch or trigger a native digital assistant to execute on the client device to perform the action. In another example, the system can generate a universal application link or custom uniform resource locator to launch a non-native digital assistant application on the client device to perform the action. In yet another example, the system can select a different device with a digital assistant to perform the action. Platform-specific action linking can refer to or include executing an action based on a type of operating system, type of device, characteristic of a device, configuration of a device, or capability of a device, for example.

Accordingly, and in some cases, the system can dynamically determine a mode of execution based on a configuration, type of device, applications installed on the device, network connections, or other characteristics associated with the computing environment. For example, if a digital assistant application is installed, the system can navigate to the digital assistant application and input a command to execute the digital action responsive to the call-to-action. If, on the other hand, if a digital assistant application is not installed on the device, the system can provide a notification requesting installation of the digital assistant application prior to execution of the digital action. The notification can include a link, path, or pointer to a cloud-based repository of application executable files that can be downloaded and installed by the device.

The system can launch a digital assistant on a different device to execute the digital action. For example, the electronic resource can include a webpage that is rendered in an application such as a web browser. The call-to-action can be presented via the web browser. The call-to-action can be overlaid on the electronic resource as a banner, pop-up, interstitial, or in some other manner. The system can detect an interaction with the call-to-action or other indication to execute the digital action corresponding to the call-to-action. The system can determine current computing environment information, such as the type of web browser, device, network connectivity, account information associated with the device executing the application, or additional devices linked to the account. The system can, via a dynamic device selector component or functionality, display a web-page with a list of devices linked to a same account as the device that provided the call-to-action. The system can pre-process or filter the list of the devices such that the devices that are presented are only those devices that are compatible or capable of executing the digital action corresponding to the call-to-action. In some cases, the system can rank this list of devices to weight devices based on relevancy, capability, compatibility, performance, or other factors. For example, the system can rank or filter the devices based on relevancy to the digital action (e.g., only show devices with screens for actions that may provide graphical output). The dynamic device selector of the present technical solution can rank the list of devices such that devices that are most relevant to a current computing context are ranked higher than devices that are less relevant to the current computing context (e.g., rank recently used devices higher than devices that have not been used recently, rank frequently used devices higher than devices that are used infrequently).

FIG. 1 illustrates an example system 100 that selects interfaces and modes for execution of a digital action. The system 100 can adjust execution of digital actions. The system 100 can include content selection infrastructure. The system 100 can include a data processing system 102. The data processing system 102 can include or execute on a computing device 122. The data processing system 102 can communicate with one or more of a 3P digital content provider device 134, remote data processing system 136, or 3P electronic resource server 142 148 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device 122, such as a laptop, desktop, tablet, personal digital assistant, smart phone, portable computers, or speaker. For example, via the network 105 a user of the computing device 122 can access information or data provided by a 3P digital content provider device 134. The computing device 122 may or may not include a display; for example, the computing device may include limited types of user interfaces, such as a microphone and speaker. In some cases, the primary user interface of the computing device 122 may be a microphone and speaker. The computing device 122 can interface with or be included in a voice-based computing environment.

The network 105 can be used by the data processing system 102 to access information resources such as applications, web pages, web sites, domain names, or uniform resource locators that can be presented, output, rendered, or displayed by the client computing device 122. For example, via the network 105 a user of the client computing device 122 can access information or data provided by the 3P digital content provider device 134. The network 105 can include or constitute a sub-network of information resources available on the internet that are associated with a content placement or search engine results system, or that are eligible to include third party digital components as part of a digital component placement campaign.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include, interface with, communicate with, or otherwise access a 3P electronic resource server 142. The data processing system 102 can communicate with the 3P electronic resource server 142 via network 105. The 3P electronic resource server 142 can be remote from, and different from, the data processing system 102, remote data processing system 136, 3P digital content provider device 134, and computing device 122. The 3P electronic resource server 142 can be associated with a developer of the electronic resource 112. The 3P electronic resource server 142 can facilitate execution of the electronic resource 112. For example, the 3P electronic resource server 142 can perform backend processing for the electronic resource 112 executed by application 110. The application 110 executing on the computing device 122 can execute a frontend component of the application 110, and the 3P electronic resource server 142 can execute a backend component of the application 110. The application 110 executing on the computing device 122 can transmit remote procedure calls or other requests or data to the 3P electronic resource server 142. The 3P electronic resource server 142 can transmit data, information, or requests to the application 110 to perform a function or execute an action. The 3P electronic resource server 142 can modify or change a state of the application 110 or electronic resource 112 executed or provided via the application 110 executing on the computing device 122.

The system 100 can include at least one remote data processing system 136. The remote data processing system 136 can include at least one logic device such as a computing device having a processor to communicate via the network 105, for example with the data processing system 102, 3P digital content provider device 134 (e.g., content provider). The remote data processing system 136 can include at least one computation resource, server, processor or memory. For example, the remote data processing system 136 can include a plurality of computation resources or servers located in at least one data center. The remote data processing system 136 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the remote data processing system 136 components, including servers and storage systems, and coupling them with advanced system management tools allows more efficient use of server resources, which saves power and processing requirements and reduces bandwidth usage.

The remote data processing system 136 can include a digital assistant server 138 and a content selector component 140. The digital assistant server 138 can be designed, constructed and operational to perform one or more function in communication with the digital assistant component 106 of the computing device 122. The content selector component 140 can be designed, constructed and operational to select digital component items (e.g., content items) provided by the 3P digital content provider device 134. The content selector component 140 can select content items responsive to a request for content from the computing device 122. The content selector component 140 can transmit selected content items to the computing device 122 for presentation (e.g., audio output, visual output, or audiovisual output).

The system 100 can include, access, or otherwise interact with at least one 3P digital content provider device 134. The 3P digital content provider device 134 can include at least one logic device such as a computing device having a processor to communicate via the network 105, for example with the computing device 122, the data processing system 102, or the remote data processing system 136. The 3P digital content provider device 134 can include at least one computation resource, server, processor or memory. For example, the 3P digital content provider device 134 can include a plurality of computation resources or servers located in at least one data center. The 3P digital content provider device 134 can include or refer to a service provider device, or goods provider device.

The 3P digital content provider device 134 can provide audio based digital components for presentation by the computing device 122 as an audio output digital component. The digital component can include responses to search queries or requests. The digital component can include information from databases, search engines, or networked resources. For example, the digital component can include news information, weather information, sports information, encyclopedia entries, dictionary entries, or information from digital textbooks. The digital component can include offers for a good or service, such as a voice based message that states: "Would you like me to order you a taxi?" The 3P digital content provider device 134 can include memory to store a series of audio digital components that can be provided in response to a voice based query. The 3P digital content provider device 134 can also provide audio based digital components (or other digital components) to the remote data processing system 136 where they can be stored for selection by the content selector component 140. The remote data processing system 136 can select the audio digital components and provide (or instruct the content provider computing device 140 to provide) the audio digital components to the client computing device 122. The audio based digital components can be exclusively audio or can be combined with text, image, or video data. The digital components or content items can include images, text, video, multimedia, or other types of content in one or more formats.

The remote data processing system 136 can include a content placement system having at least one computation resource or server. The remote data processing system 136 can include, interface, or otherwise communicate with at least one content selector component 140. The remote data processing system 136 can include, interface, or otherwise communicate with at least one digital assistant server 138.

The content selector component 140 and digital assistant server 138 can each include at least one processing unit or other logic device such as programmable logic array engine, or module configured to communicate with one another or other resources or databases. The content selector component 140 and digital assistant server 138 can be separate components, a single component, or part of the remote data processing system 136. The system 100 and its components, such as the remote data processing system 136, can include hardware elements, such as one or more processors, logic devices, or circuits.

The remote data processing system 136 can obtain anonymous computer network activity information associated with a plurality of computing devices 122. A user of a computing device 122 can affirmatively authorize the remote data processing system 136 to obtain network activity information corresponding to the user's computing device 122. For example, the remote data processing system 136 can prompt the user of the computing device 122 for consent to obtain one or more types of network activity information. The identity of the user of the computing device 122 can remain anonymous and the computing device 122 can be associated with a unique identifier (e.g., a unique identifier for the user or the computing device provided by the data processing system or a user of the computing device). The remote data processing system 136 can associate each observation with a corresponding unique identifier.

A 3P digital content provider device 134 can establish an electronic content campaign. The electronic content campaign can be stored as content data in a data repository of the content selector component 140. An electronic content campaign can refer to one or more content groups that correspond to a common theme. A content campaign can include a hierarchical data structure that includes content groups, digital component data objects, and content selection criteria. To create a content campaign, 3P digital content provider device 134 can specify values for campaign level parameters of the content campaign. The campaign level parameters can include, for example, a campaign name, a preferred content network for placing digital component objects, a value of resources to be used for the content campaign, start and end dates for the content campaign, a duration for the content campaign, a schedule for digital component object placements, language, geographical locations, type of computing devices on which to provide digital component objects. In some cases, an impression can refer to when a digital component object is fetched from its source (e.g., remote data processing system 136 or 3P digital content provider device 134), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the digital component object for display on the computing device 122. In some cases, an impression can refer to a viewable or audible impression; e.g., the digital component object is at least partially (e.g., 20%, 30%, 30%, 40%, 50%, 60%, 70%, or more) viewable on a display device of the client computing device 122, or audible via a speaker of the computing device 122. A click or selection can refer to a user interaction with the digital component object, such as a voice response to an audible impression, a mouse-click, touch interaction, gesture, shake, audio interaction, or keyboard click. A conversion can refer to a user taking a desired action with respect to the digital component objection; e.g., purchasing a product or service, completing a survey, visiting a physical store corresponding to the digital component, or completing an electronic transaction.

The 3P digital content provider device 134 can further establish one or more content groups for a content campaign. A content group includes one or more digital component objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the digital component in the presence of the negative keyword on main content), bids for keywords, or parameters associated with the bid or content campaign.

To create a new content group, the 3P digital content provider device 134 can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the 3P digital content provider device 134 can use to capture a topic or subject matter for which digital component objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The 3P digital content provider device 134 can provide one or more keywords and digital component objects to each content group. Keywords can include terms that are relevant to the product or services of associated with or identified by the digital component objects. A keyword can include one or more terms or phrases. For example, the car dealership can include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords. The content provider can specify a type of matching, such as exact match, phrase match, or broad match, used to select digital component objects.

The 3P digital content provider device 134 can provide one or more keywords to be used by the remote data processing system 136 to select a digital component object provided by the 3P digital content provider device 134. The 3P digital content provider device 134 can identify one or more keywords to bid on, and further provide bid amounts for various keywords. The 3P digital content provider device 134 can provide additional content selection criteria to be used by the remote data processing system 136 to select digital component objects. Multiple 3P digital content provider devices 134 can bid on the same or different keywords, and the remote data processing system 136 can run a content selection process or ad auction responsive to receiving an indication of a keyword of an electronic message.

The 3P digital content provider device 134 can provide one or more digital component objects for selection by the remote data processing system 136. The remote data processing system 136 (e.g., via content selector component 140) can select the digital component objects when a content placement opportunity becomes available that matches the resource allocation, content schedule, maximum bids, keywords, and other selection criteria specified for the content group. Different types of digital component objects can be included in a content group, such as a voice digital component, audio digital component, a text digital component, an image digital component, video digital component, multimedia digital component, or digital component link. Upon selecting a digital component, the data processing system 102 can transmit the digital component object for presentation via the computing device 122, rendering on a computing device 122 or display device of the computing device 122. Rendering can include displaying the digital component on a display device, or playing the digital component via a speaker of the computing device 122. The remote data processing system 136 can provide instructions to a computing device 122 to render the digital component object. The remote data processing system 136 can instruct the digital assistant component 106 of the computing device 122, or an audio driver 132 of the computing device 122, to generate audio signals or acoustic waves. The remote data processing system 136 can instruct the application 110 executed by the computing device 122 to present the selected digital component object. For example, the application 110 can include a slot (e.g., a content slot) in which the digital component object can be presented (e.g., audio slot or visual slot).

The data processing system 102 can include, execute, or otherwise communicate with a content selector component 140 to receive the queries, keywords or trigger keyword identified by the natural language processor and select, based on the trigger keyword, a digital component. The content selector component 140 can select the digital component via a real-time content selection process. The content selection process can include, for example, performing a search via a search engine, or accessing a database stored on a remote server or device such as a 3P digital content provider device 134. The content selection process can refer to, or include, selecting sponsored digital component objects provided by third party content providers 134. The real-time content selection process can include a service in which digital components provided by multiple content providers are parsed, processed, weighted, or matched in order to select one or more digital components to provide to the computing device 122. The content selector component 140 can perform the content selection process in real-time. Performing the content selection process in real-time can refer to performing the content selection process responsive to the request for content received via the client computing device 122. The real-time content selection process can be performed (e.g., initiated or completed) within a time interval of receiving the request (e.g., 1 second, 2 seconds, 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client computing device 122, or within a time interval after the communication session is terminated. The data processing system 102 can select an audio chime to provide subsequent to completion of the digital component selection process or other digital task.

For example, the data processing system 102 can include a content selector component 140 designed, constructed, configured or operational to select digital component objects. To select digital components for display in a voice-based environment, the data processing system 102 (e.g., via an NLP component of the digital assistant component 106) can parse the input audio signal to identify queries, keywords (e.g., a trigger keyword), and use the keywords to select a matching digital component. The data processing system 102 can select the matching digital component based on a broad match, exact match, or phrase match. For example, the content selector component 140 can analyze, parse, or otherwise process subject matter of candidate digital components to determine whether the subject matter of the candidate digital components correspond to the subject matter of the keywords or phrases of the input audio signal detected by the microphone of the client computing device 122. The content selector component 140 may identify, analyze, or recognize voice, audio, terms, characters, text, symbols, or images of the candidate digital components using an image processing technique, character recognition technique, natural language processing technique, or database lookup. The candidate digital components may include metadata indicative of the subject matter of the candidate digital components, in which case the content selector component 140 may process the metadata to determine whether the subject matter of the candidate digital component corresponds to the input audio signal.

3P digital content providers 134 may provide additional indicators when setting up a content campaign that includes digital components. The content provider may provide information at the content campaign or content group level that the content selector component 140 may identify by performing a lookup using information about the candidate digital component. For example, the candidate digital component may include a unique identifier, which may map to a content group, content campaign, or content provider. The content selector component 140 may determine, based on information stored in content campaign data structure in data repository 108, information about the 3P digital content provider device 134.

The remote data processing system 136 can receive, via a computer network, a request for content for presentation on a computing device 122. The data processing system 102 can identify the request by processing an input audio signal detected by a microphone of the client computing device 122. The request can include selection criteria of the request, such as the device type, location, and a keyword associated with the request.

Responsive to the request, the remote data processing system 136 can select a digital component object from a data repository or a database that can include content provided by one or more 3P digital content provider devices 134, and provide the digital component for presentation via the computing device 122 via network 105. The computing device 122 can interact with the digital component object. The computing device 122 can receive an audio response to the digital component. The computing device 122 can receive an indication to select a hyperlink or other button associated with the digital component object that causes or allows the computing device 122 to identify a service provider, request a service from the service provider, instruct the service provider to perform a service, transmit information to the service provider, or otherwise query the service provider device.

The computing device 122 (or client computing device or client device) can include or execute a data processing system 102. The data processing system 102 can include, interface, or otherwise communicate with at least one interface 104. The data processing system 102 can include, interface, or otherwise communicate with at least one local digital assistant component 106 (or digital assistant component 106). The local digital assistant component 106 can include natural language processing capabilities or functionalities. The local digital assistant component 106 can include a natural language processor ("NLP") component. The data processing system 102 can include, interface, or otherwise communicate with at least one data repository 108. The data processing system 102 can include or execute at least one application 110. The data processing system 102 can at least partially execute the at least one application 110 (e.g., the application can include a client component and a server component). The application 110 can execute or provide an electronic resource 112. The electronic resource 112 can include a script library 114. The script library 114 can include, access, provide or otherwise utilize an dynamic notifier component 116, or digital assistant selector component 120.

The data repository 108 can include one or more local or distributed databases, and can include a database management system. The data repository 108 can include computer data storage or memory and can store applications 110, application data, profiles, indexes, device configuration information, account information, preference, data associated with the electronic resource, among other data. Applications 110 can include an executable file, application package file, configuration file, or other data that facilitates execution of the application.

The interface 104, digital assistant component 106, application 110, or other component of the data processing system 102 can each include or utilize at least one processing unit or other logic device such as programmable logic array engine, or module configured to communicate with one another or other resources or databases. The interface 104, digital assistant component 106, application 110 or other components of the data processing system 102 can be separate components, a single component, or part of the data processing system 102. The system 100 and its components, such as the data processing system 102, can include hardware elements, such as one or more processors, logic devices, or circuits. Components, systems or modules of the data processing system 102 can be executed at least partially by the remote data processing system 136.

The computing device 122 can include, interface, or otherwise communicate with at least one sensor 130, transducer 126, audio driver 132, pre-processor 124, or display device 128. The sensor 130 can include, for example, an ambient light sensor, proximity sensor, temperature sensor, accelerometer, gyroscope, motion detector, GPS sensor, location sensor, microphone, or touch sensor. The transducer 126 can include a speaker or a microphone. The audio driver 132 can provide a software interface to the hardware transducer 126. The audio driver can execute the audio file or other instructions provided by the data processing system 102 to control the transducer 126 to generate a corresponding acoustic wave or sound wave. The display device 128 can include one or more component or functionality of display 735 depicted in FIG. 7. The pre-processor 124 can be configured to detect a trigger keyword, predetermined hot word, initiation keyword, or activation keyword. In some cases, the trigger keyword can include a request to perform an action. In some cases, the trigger keyword can include predetermined action keyword to enable or activate the computing device 122, and the request keywords can follow the trigger keyword or hot word. The pre-processor 124 can be configured to detect a keyword and perform an action based on the keyword. The pre-processor 124 can detect a wake-up word or other keyword or hotword, and responsive to the detection, invoke the digital assistant component 106 of the data processing system 102 executed by computing device 122. In some cases, the pre-processor 124 can filter out one or more terms or modify the terms prior to transmitting the terms to the remote data processing system 136 for further processing. The pre-processor 124 can convert the analog audio signals detected by the microphone into a digital audio signal, and transmit or provide one or more data packets carrying the digital audio signal to the data processing system 102 or the remote data processing system 136 via the network 105. In some cases, the pre-processor 124 can provide, to the digital assistant component 106 or the remote data processing system 136, data packets carrying some or all of the input audio signal, responsive to detecting an instruction to perform such transmission. The instruction can include, for example, a trigger keyword or other keyword or approval to transmit data packets comprising the input audio signal to the data processing system 102 or the remote data processing system 136.

The client computing device 122 can be associated with an end user that enters voice queries as audio input into the client computing device 122 (via the sensor 130) and receives audio output in the form of a computer generated voice that can be provided from the data processing system 102 (or the 3P digital content provider device 134) to the client computing device 122, output from the transducer 126 (e.g., a speaker). The computer generated voice can include recordings from a real person or computer generated language.

The data processing system 102 can include an interface 104 designed, configured, constructed, or operational to receive and transmit information using, for example, data packets. The interface 104 can receive and transmit information using one or more protocols, such as a network protocol. The interface 104 can include a hardware interface, software interface, wired interface, or wireless interface. The interface 104 can facilitate translating or formatting data from one format to another format. For example, the interface 104 can include an application programming interface that includes definitions for communicating between various components, such as software components. The interface 104 can facilitate communications between one or more component of the system 100, such as between the digital assistant component 106, the application 110, and the data repository 108.

The data processing system 102 can include a local digital assistant component 106. The local digital assistant component 106 can include an application, script or program installed at the client computing device 122. The local digital assistant component 106 can receive input signals, data packets or other information. The local digital assistant component 106 can receive data packets or other input via interface 104. The local digital assistant 106 can include an application to receive input audio signals from the interface 104 of the data processing system 102, and to drive components of the client computing device to render output audio signals. The data processing system 102 can receive data packets or other signals that include or identify an audio input signal. For example, the local digital assistant component 106 can be configured with NLP techniques, functionality or components that can receive or obtain the audio signal and parse the audio signal. The digital assistant component 106 can provide for interactions between a human and a computer. The digital assistant component 106 can be configured with techniques for understanding natural language and allowing the data processing system 102 to derive meaning from human or natural language input. The digital assistant component 106 can include or be configured with technique based on machine learning, such as statistical machine learning. The digital assistant component 106 can utilize decision trees, statistical models, or probabilistic models to parse the input audio signal. The digital assistant component 106 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The digital assistant component 106 can (e.g., utilizing an NLP technique, functionality or component) convert the audio input signal into recognized text by comparing the input signal against a stored, representative set of audio waveforms and choosing the closest matches. The set of audio waveforms can be stored in data repository 108 or other database accessible to the data processing system 102. The representative waveforms can be generated across a large set of users, and then may be augmented with speech samples from the user. After the audio signal is converted into recognized text, the digital assistant component 106 can match the text to words that are associated, for example via using a model stored in data repository 108 that has been trained across users or through manual specification, with actions that the data processing system 102 can serve.

The audio input signal can be detected by the sensor 130 or transducer 126 (e.g., a microphone) of the client computing device 122. Via the transducer 126, the audio driver 132, or other components the client computing device 122 can provide the audio input signal to the data processing system 102, where it can be received (e.g., by the interface 104) and provided to the local digital assistant 106 or stored in the data repository 108.

The digital assistant component 106 can obtain the input audio signal. From the input audio signal, the digital assistant component 106 can identify at least one request or at least one trigger keyword corresponding to the request. The request can indicate intent or subject matter of the input audio signal. The trigger keyword can indicate a type of action likely to be taken. For example, the digital assistant component 106 can parse the input audio signal to identify at least one request to invoke an application. The digital assistant component 106 can parse the input audio signal to identify at least one request, such as a request to leave home for the evening to attend dinner and a movie. The keyword can include at least one word, phrase, root or partial word, or derivative indicating an action to be taken. For example, the keyword "go" or "to go to" from the input audio signal can indicate a need for transport. In this example, the input audio signal (or the identified request) does not directly express an intent for transport, however the keyword indicates that transport is an ancillary action to at least one other action that is indicated by the request.

The digital assistant component 106 can parse the input audio signal to identify, determine, retrieve, or otherwise obtain the request and the keyword. For instance, the digital assistant component 106 can apply a semantic processing technique to the input audio signal to identify the keyword or the request. The digital assistant component 106 can apply the semantic processing technique to the input audio signal to identify one or more keywords. A keyword can include one or more terms or a phrase. The digital assistant component 106 can apply the semantic processing technique to identify an intent to perform a digital action.

For example, the computing device 122 can receive an input audio signal detected by a sensor 130 (e.g., microphone) of the client computing device 122. The input audio signal can be "Digital assistant, I need someone to do my laundry and my dry cleaning." A pre-processor 124 of the client computing device 122 can detect a wakeup word, hot word, or trigger keyword in the input audio signal, such as "Digital assistant". The pre-processor 124 can detect the wakeup word, hot word, or trigger keyword by comparing an audio signature or waveform in the input audio signal with a model audio signature or waveform that corresponds to the trigger keyword. The pre-processor 124 can determine that the input audio signal includes a wakeup word, hot word, or trigger keyword that indicates that the input audio signal is to be processed by the digital assistant component

106. Responsive to detecting hot word, wakeup word, or trigger keyword, the pre-processor 124 can determine, authorize, route, forward, or other provide the detected input audio signal to the data processing system 102 for processing by the digital assistant component 106.

The digital assistant component 106 can receive the input audio signal and apply a semantic processing technique, or other natural language processing technique, to the input audio signal comprising the sentence to identify trigger phrases "do my laundry" and "do my dry cleaning". In some cases, the digital assistant component 106 can provide data packets corresponding to the input audio signal to the remote data processing system 136 to cause the digital assistant server 138 to process the input audio signal. The digital assistant component 106 can process the input audio signal in conjunction with or via the digital assistant server 138. The digital assistant component 106 can further identify multiple keywords, such as laundry, and dry cleaning.

The digital assistant component 106 can identify search queries, keywords, intents or phrases corresponding to performing a search or other request for information. The digital assistant component 106 can determine that the input audio signal corresponds to a request for information about a topic, event, current event, news event, dictionary definition, historical event, person, place or thing. For example, the digital assistant component 106 can determine that the input audio signal corresponds to a query, request, intent, or action to make travel arrangements, book a ride, obtain information, perform a web search, check stock prices, launch an application, check the news, order food, or shop for other products, goods or services.

The digital assistant component 106 can use one or more techniques to parse or process the input audio signal. Techniques can include rule-based techniques or statistical techniques. Techniques can utilize machine learning or deep learning. Example techniques can include named entity recognition, sentiment analysis, text summarization, aspect mining, or topic mining. Techniques can include or be based on text embeddings (e.g., real values vector representations of strings), machine translation (e.g., language analysis and language generation), or dialogue and conversations (e.g., models used by artificial intelligence). Techniques can include determine or leverage syntax techniques (e.g., arrangement of words in a sentence based on grammar) such as lemmatization, morphological segmentation, word segmentation, part-of-speech tagging, parsing, sentence breaking, or stemming. Techniques can include determine or leverage semantics techniques such as named entity recognition (e.g., determining the parts of the text that can be identified and categorized into present groups such as names of application 110, people or places), word sense disambiguation, or natural language generation.

In some cases, the digital assistant component 106 can launch the application 110. In some cases the application 110 may already be launched prior to the digital assistant component 106 receiving the input audio signal. For example, based on processing or parsing the input audio signal, the digital assistant component 106 can identify an application 110 to invoke, launch, open, or otherwise activate. The digital assistant component 106 can identify the application 110 based on parsing the input audio signal to identify the terms, keywords, trigger keywords or phrases. The digital assistant component 106 can perform a lookup in the data repository 108 using the identified terms, keywords, trigger keywords or phrases to identify the application 110. In some cases, the keyword can include an identifier of the application 110, such as "Application Name A" or "Application Name B". In some cases, the keyword can indicate a type or category of application 110, such as ride sharing application, restaurant booking application, movie ticket application, news application, weather application, navigation application, streaming music application, streaming video application, restaurant review application, or other type or category of application 110. For cases in which the application 110 may already be launched and executing prior to receipt of the input audio signal, the digital assistant component 106 can process the input audio signal to determine an action to perform in the application 110 or responsive to a call-to-action presented via the electronic resource 112 rendered by the application 110.

The client computing device 122 can execute an application 110. The data processing system 102 can execute an application 110. The data processing system 102 can include or execute an operating system via which the client computing device 122 can execute the application 110. The application 110 can include any type of application the client computing device 122 is configured to execute, run, launch, or otherwise provide. The application 110 can include a multimedia application, music player, video player, web browser, word processor, mobile application, desktop application, tablet application, electronic game, an electronic commerce application, or other type of application 110. The application 110 can execute, render, load, parse, process, present or otherwise output data corresponding to an electronic resource 112. An electronic resource 112 can include, for example, a web site, web page, multimedia web content, video content, audio content, travel content, entertainment content, content related to shopping for goods or services, or other content.

The application 110 can receive data associated with the electronic resource 112 from a third-party ("3P") electronic resource server 142. The 3P electronic resource server 142 can provide the electronic resource 112 for execution by the application 110. The 3P electronic resource server 142 can include a file server, web server, gaming server, multimedia server, cloud computing environment, or other backend computing system configured to provide data to cause the application 110 to present or provide the electronic resource 112 via the computing device 122. The computing device 122 can access the 3P electronic resource server 142 via network 105.

An administrator of the 3P electronic resource server 142 can develop, establish, maintain or provide the electronic resource 112. The 3P electronic resource server 142 can transmit the electronic resource 112 to the computing device 122 responsive to a request for the electronic resource 112. The electronic resource 112 can be associated with an identifier, such as a uniform resource locator ("URL"), uniform resource identifier, web address, or filename, or file path. The 3P electronic resource server 142 can receive the request for the electronic resource 112 from the application 110. The electronic resource 112 can include an electronic document, webpage, multimedia content, streaming content, audio, video, text, images, video game, or other digital or electronic content The administrator of the 3P electronic resource server 142 can provide a script library 114. The 3P electronic resource server 142 can embed the script library 114 in the electronic resource 112. The script library 114 can include a JavaScript library. The script library 114 can be configured to communicate with the remote data processing system 136 to provide digital assistant-based functionality for the electronic resource 112. The script library 114 can provide user interface elements (e.g., buttons, forms, autocomplete suggestion) on the electronic resource 112.

The data processing system 102 can load a graphical user interface element corresponding to the script library 114 at a location on the electronic resource 112 established by a provider of the electronic resource. The script library 114 can be launched in an inline frame ("iframe") on the electronic resource 112. By launching or executing in an iframe on the electronic resource 112, the data processing system 102 can host the script library 114, or corresponding user interface elements, in a secure computing environment. The computing environment can be secure with reference to the electronic resource or the 3P electronic resource server 142. For example, the iframe in which the script library 114 executes can control or prevent access to the contents or data of the iframe. The iframe can prevent the electronic resource 112 or the 3P electronic resource server 142 from accessing contents or data associated with the script library 114. The script library 114 executing in the iframe can communicate data with the digital assistant server 138 without the electronic resource 112 (or 3P electronic resource server 142) obtaining access to the data. The script library 114 can obtain data or information associated with the data processing system 102, an account logged into the data processing system 102, the computing device 122 or other information.

The administrator of the electronic resource 112 can place hypertext markup language ("HTML") markup on the electronic resource 112. The electronic resource 112 can include HTML markup. The HTML markup on the electronic resource 112 can include description or configuration settings for the manner in which the script library is to display user interface elements on the electronic resource 112. The following illustrates an example of HTML markup of an electronic resource 112:

<digital-assistant-action-link-group>
  <digital-assistant-action-link
    title="Market updates"
    href="https://assistant.digital.com/services/invoke/uid/000000d139bbc4d4">
  </digital-assistant-action-link>
  <digital-assistant-action-link
    title="What's my balance?"
    href="https://assistant.digital.com/services/invoke/uid/000000d139bbc4d4">
  </digital-assistant-action-link>
</digital-assistant-action-link-group>

The customized web element <digital-assistant-action-link-group> can act as a container, holding call-to-actions that the 3P electronic resource server 142 provides for display on the electronic resource 112. Each <digital-assistant-action-link> within the container can represent a single call-to-action to be displayed on the electronic resource 112. The 3P can specific additional configuration for the call-to-actions on the page, such as icons, a project identifier, or attributes. For example, an attribute can be a hypertext reference ("href"), and have a type "string". The href attribute can include an action link uniform resource locator "URL" to link into a native digital assistant experience. The URL can be validated before rendering the selected action user interface. The data processing system 102 can block or not render invalid action links. To validate the action link, the data processing system 102 or remote data processing system 136 can: 1) determine whether the loaded script library 114 suffix matches the URL suffix of the action link; 2) determine that the loaded script library 114 has an action for the intent of the action link; and 3) determine whether the loaded script library 114 has links enabled for the intent of the action link.

Another example attribute can include "title" and have a type "string". The title attribute can display or provide a title. The title can be the same as the intent title of the action link, or a different title set by an administrator of the electronic resource 112.

The application 110, such as a web browser, can load the electronic resource 112. Loading the electronic resource 112 can include downloading the data or contents of the electronic resource 112 from the 3P electronic resource server 142 or other file server or web server or host server. Loading the electronic resource 112 can include the application 110 rendering or executing the electronic resource 112. Loading the electronic resource 112 can include the application 110 loading the script library 114 embedded with the electronic resource 112. The script library can include multiple call-to-actions for the electronic resource 112 configured for execution by one or more digital assistants. The call-to-actions can be configured for execution by a local digital assistant component 106 or a digital assistant server 138. The call-to-actions can be executed by both the local digital assistant component 106 and the digital assistant server 138. For example, the local digital assistant component 106 and the digital assistant server 138 can communicate with one another to execute the call-to-actions, or execute different portions of the call-to-action.

The computing device 122, or data processing system 102, can be associated or linked with multiple digital assistants that are executed by multiple computing devices 122. The digital assistants can be associated or linked with the same account identifier. For example, a user can log into the data processing system 102 with a username and password, or other credentials. The data processing system 102 can authenticate and authorize the user to utilize a digital assistant component. The account can be associated with multiple computing devices 122, such as a smartphone, laptop computer, tablet computer, smartwatch, and desktop computer. Each of the computing devices 122 can include a local digital assistant component 106 that can interface with a digital assistant server 138. Thus, the script library can be configured with call-to-actions that can be executed by one or more digital assistants corresponding to the one or more local digital assistant components 106 executed by one or more computing devices 122 that are linked or associated with the same account identifier of a user of the computing device 122.

Upon loading the electronic resource 112, the application 110 can cause the script library 114 to load in a secure iframe of the electronic resource 112. The script library 114 can launch, invoke, initiate, execute, call or otherwise provide one or more components, such as an dynamic notifier component 116, and a digital assistant selector component 120. The components of the script library 114 can communicate with one or more component or element of the data processing system 102 or remote data processing system 136 in a secure manner, such as without the 3P electronic resource server 142 obtaining the communicated data. The script library can be established by a third-party service provider (e.g., a 3P electronic resource server 142) with call-to-actions that include a predetermined set of call-to-actions selected by the third-party service provider. An administrator of 3P electronic resource server 142 can establish call-to-actions for the electronic resource 112, and embed the call-to-actions in the script library 114. Each call-to-action can be associated with attributes or metadata that indicate what task the call-to-action or when, or under what conditions, to invoke or present the call-to-action. The script library 114 can be designed, configured and operational to perform one or more functions, processes or methods depicted in FIG. 2 and FIG. 3, such as processes 200 and 300.

The dynamic notifier component 116 can be designed, constructed and operational to query the digital assistant component 106 to determine an historic level of engagement between computing device 122 and one or more digital assistants. The dynamic notifier component 116 can determine the historic level of engagement between digital assistants and an account associated with the computing device 122. The account can be associated with multiple computing devices. In some cases, the historical level of engagement can be based on engagement with a digital assistant on all the computing devices 122 associated with the same account. In some cases, the historic level of engagement can be based on engagement with the digital assistant associated with the computing device 122 that loaded the script library 114.

The dynamic notifier component 116 can determine what call-to-action to present, and then select a type of digital interface with which to present the call-to-action. To select the call-to-action, the dynamic notifier component 116 can determine a current context or state of the electronic resource 112. For example, the state or context can refer to or include a search state, purchase state, checkout flow, or information gathering flow. The context can indicate that a user is searching for flights, or was unable to identify flights with a desired price, time, or duration, for example. The electronic resource 112 can present a survey or prompt to obtain context information. The dynamic notifier component 116 can identify a call-to-action associated with a current context or state of the electronic resource 112.

In order to select a type of interface to generate, the dynamic notifier component 116 can determine the historic level of engagement. Historical level engagement can refer to a previous level of engagement. Historic level of engagement can refer to the level of engagement prior to the current time. Historical level of engagement can refer to the level of engagement in the last 24 hours, 48 hours, 72 hours, 1 week, 2 weeks, 3 weeks, 4 weeks, 30 days, 60 days, 90 days, 6 months, or more.

The data processing system 102 (e.g., via dynamic notifier component 116) can receive, via a network 105 from a digital assistant server 138 remote from the data processing system 102, information about the historic level of engagement. The dynamic notifier component 116 can determine the level of engagement based on an amount of use of a digital assistant. Level of engagement can be based on a number of uses of a digital assistant, number of interactions with a digital assistant, or number of times a digital assistant has been launched or invoked. Level of engagement can be based on the types of interactions with a digital assistant. Types of interactions can include, for example, categories or types of tasks performed by the digital assistant, types of queries, types of requests, or types of call-to-actions. Example types of tasks or call-to-actions can include launching an application, performing an online search, making a purchase, ordering a service, a ride share request, checking the weather or other type of task. Categories of tasks or call-to-actions can include, for example, requests for information, entertainment tasks, purchases, commerce, rideshare requests, or multimedia requests. The dynamic notifier component 116 can determine the historic level of engagement based on a number of previous interactions between the plurality of client computing devices during a time interval (e.g., last 24 hours, 48 hours, 7 days, or 30 days).

The dynamic notifier component 116 can determine the level of engagement for a particular category or task. Level of engagement can be determined for a particular electronic resource 112 or application 110. Level of engagement can be determined for a particular time of day, day of the week, or location of the computing device 122. Level of engagement can be determined for a particular account logged into the computing device 122. Level of engagement can be determined for a particular user of the computing device 122.

The dynamic notifier component 116 can determine the level of engagement as a score, value, percentage, or other label. For example, the dynamic notifier component 116 can determine the level of engagement as one of low, medium, or high. The dynamic notifier component 116 can determine a numeric value or score to represent the level of score. For example, the dynamic notifier component 116 can use a scale from 1 to 10 to represent the level of engagement, with 1 being the lowest level of engagement, and 10 being the highest level of engagement. In another example, the dynamic notifier component 116 can represent the level of engagement as a grade, such as A, B, C, D or F, with A being the highest level of engagement, and F being the lowest level of engagement. The dynamic notifier component 116 can use a binary value to represent the level of engagement, with 1 indicating that there has been historic engagement between the account and a digital assistant during a previous time interval (e.g., last 1 week), and 0 indicating that there has been no engagement between the account and digital assistant or that the account was recently created.

The level of engagement can be based on multiple factors. The multiple factors can be combined to determine an overall level of engagement. Factors can include, for example, types of engagement, categories of engagement, or other aspects of historic engagement. For example, the dynamic notifier component 116 can assign a value for multiple engagement factors, and then combine the values (e.g., sum, product, average, or weighted average) to determine an overall score. For example: number of engagements in past week+number of engagements with same electronic resource 112+number of engagements with same category of electronic resource 112+number of engagements on same computing device 122. The dynamic notifier component 116 can determine an overall score based on these factors. The dynamic notifier component 116 can compare the score with a threshold to determine whether the level of engagement is low or high; or map the score to a more granular levels such as low, medium-low, medium, medium-high, or high level of engagement. The thresholds can be predetermined or configured by an administrator of the remote data processing system 136. The threshold can be dynamically determined based on an aggregated level of engagement of other accounts.

For example, the electronic resource 112 can be a website directed to purchasing flight tickets. The dynamic notifier component 116 can determine that a digital assistant was used to facilitate purchasing flight tickets on this electronic resource 112 in the past 30 days. Accordingly, the dynamic notifier component 116 can determine that the level of engagement for this account and this electronic resource 112 is high.

To determine the historic level of engagement, the dynamic notifier component 116 can communicate with the digital assistant server 138 via network 105. The dynamic notifier component 116 can transmit a request or query to the digital assistant server 138 to obtain information from the digital assistant server 138 regarding a historic level of engagement between the account logged into the computing device 122 and digital assistant. In some cases, the dynamic notifier component 116 can obtain the information from the local digital assistant component 106. For example, the dynamic notifier component 116 can query or otherwise communicate with the local digital assistant component 106 to determine the level of engagement. The local digital assistant component 106 can store information relating to historic or previous engagements, interactions, uses, invocations, or use of the digital assistant component 106 or a digital assistant 106 on other computing devices associated with the same account.

The dynamic notifier component 116 can access the information relating to the historic level of engagement in a secure manner. For example, the script library 114 can be launched in an iframe that can be a secure computing environment or sandboxed computing environment that prevents the electronic resource 112 from accessing data obtained or used by the dynamic notifier component 116. Thus, the dynamic notifier component 116 can determine the historic level of engagement for the account without the electronic resource 112 obtaining the information.

The dynamic notifier component 116 can determine a property of the computing device 122 (e.g., client computing device). Property of the computing device 122 can refer to or include a type of computing device, location of the computing device, configuration of the computing device, application installed on the computing device, operating system of the computing device, battery power remaining, performance capabilities, or available interfaces. For example, a property relating to type of device can include mobile device or desktop device, smartphone, tablet, desktop, smartwatch, wearable device, smart speaker, smart television, or an appliance. A property of the computing device 122 can indicate whether or not the computing device 122 has a native digital assistant, a microphone, or speaker. A native digital assistant can refer to a local digital assistant component 106 being integrated or part of the operating system installed or executing on the computing device 122. A computing device 122 without a native digital assistant can have a digital assistant component installed as a third party application on the computing device 122. In some cases, the computing device 122 may not have any digital assistant installed, in which case the property value can indicate that no digital assistants are installed or available. A property can include whether an account associated with the electronic resource has been logged into.

The dynamic notifier component 116 can determine device properties. The dynamic notifier component 116 can obtain the device properties from the remote data processing system 136. For example, the remote data processing system 136 can transmit device properties to the data processing system 102. In some cases, the data processing system 102 can obtain device properties directly from the computing device 122. Properties can include, for example: account identifier; device operating system type; device operating system version; or device location.

The dynamic notifier component 116 can select a type of digital interface in which to present a call-to-action of the call-to-actions included in the script library 114. The dynamic notifier component 116 can select the type of digital interface based on a property of the computing device 122 and the historic level of engagement. A call-to-action can correspond to a task associated with the electronic resource 112 that a digital assistant can perform. Example tasks can include ordering a ride from a ridesharing application, booking flights on a travel electronic resource, purchasing goods or services from a commerce electronic resource, follow-on or recurring tasks on the electronic resource, or conducting a financial transaction, for example.

Types of digital interfaces in which to present a call-to-action can include an icon located in a corner of the electronic resource or display device of the computing device 122, banner, pop-up window, overlay, animated icon, scrolling text, flashing icon, inline text or image, or audio output. Types of digital interfaces can be conspicuous digital interfaces (e.g., an overlay over the entire electronic resource 112 or a majority of an area of the electronic resource 112), or a subtle or inconspicuous digital interface (e.g., an icon in a top right corner of the electronic resource 112 that does not obfuscate the remainder of the electronic resource).

The dynamic notifier component 116 can select the type of digital interface based on a property of the client computing device 122 and the historic level of engagement. The dynamic notifier component 116 can use various techniques to select the digital interface based on one or more properties and the historic level of engagement. For example, the selection techniques used by the dynamic notifier component 116 can use or include one or more of account preferences, predetermined configuration, mapping, historical performance of digital interfaces, or machine learning.

The dynamic notifier component 116 can use account preferences to select the digital interface. The account preferences can indicate a preference for a digital interface depending on the type of computing device. For example, a user of the computing device 122 can establish account preferences. The account preferences can include a ranking of preferences of types of digital interfaces for types of computing device 122. For example, the ranking of digital interfaces for a smartphone can be: 1) icon in corner of screen; 2) banner; and 3) overlay over electronic resource, where 1 represent the highest rank (or most preferred type of digital interface) and 3 represent the lowest rank (or least preferred type of digital interface). The dynamic notifier component 116 can augment this ranking with the historic level of engagement associated with the smartphone to select a type of digital interface. For example, if the historic level of engagement has been high, then the dynamic notifier component 116 can select the highest ranked type of digital interface. If the historic level of engagement has been low, then the dynamic notifier component 116 can determine to select a different type of digital interface in order to increase the likelihood of engagement with the digital assistant. In another example, if the historic level of engagement with digital assistant is high, then the dynamic notifier component 116 can override the ranking to select a type of digital interface that is more conspicuous so as to increase the likelihood of engagement with the digital assistant. Increasing the likelihood of engagement with a digital assistant can reduce computing resource utilization because a digital assistant can increase efficiency in performance of a computing task.

The dynamic notifier component 116 can utilize a predetermined mapping to select a type of digital interface. An example mapping is illustrated in Table 1.

TABLE 1

Illustrative Mapping of Property and Historic Level of Engagement to Type of Digital Interface

| Property | Historic Level of Engagement | Type of Digital Interface |
| --- | --- | --- |
| Smartphone with native digital assistant | Low | Icon in corner of electronic resource |
| Smartphone with native digital assistant | medium | Banner in bottom of electronic resource |
| smartphone with native digital assistant | high | Conspicuously overlay interface over electronic resource |
| Smartphone with no digital assistant installed | low | Icon in corner of electronic resource |
| Smartphone with no digital assistant installed | medium | Banner in bottom of electronic resource |
| Smartphone with no digital assistant installed | high | Banner in bottom of electronic resource |

The dynamic notifier component 116 can utilize a mapping provided by an administrator of the digital assistant server 138 or 3P electronic resource server 142. The mapping can be referred to as a selection technique, policy, or logic. The dynamic notifier component 116 can determine the property and level of historic engagement to identify a type of digital interface to select. The dynamic notifier component 116 can perform a lookup in the map using the property and level to identify the corresponding type of digital interface.

The dynamic notifier component 116 can use historical performance of digital interfaces to determine a digital interface to select. The dynamic notifier component 116 can obtain properties and levels of historic engagement associated with the performance of digital interfaces. Performance of the digital interface can refer to whether the interface resulted in an interaction or execution of the call-to-action. Positive performance can refer to executing the call-to-action to cause engagement with a digital assistant, whereas negative performance can refer to closing, terminating or otherwise not executing the call-to-action or not invoking or using a digital assistant to perform a task. The dynamic notifier component 116 can utilize a model trained by a machine learning technique in which the features of the model can include one or more properties, historic level of engagement, type of digital interface, and performance of the digital interface (e.g., a binary value that indicates executing the call-to-action or absence of execution of the call-to-action).

The dynamic notifier component 116 can use the machine learning technique to select the type of digital interface. One or more components or systems can generate the model using the machine learning technique. For example, the remote data processing system 136 (e.g., via digital assistant server 138) can generate the model, the local digital assistant component 106 can generate the model, or the dynamic notifier component 116 can generate the model. The data used to train a model used by the machine learning using data for a particular account. The dynamic notifier component 116 can generate or use a model for a particular account using data associated with the account. In some cases, the dynamic notifier component 116 can aggregate de-identified or anonymized data associated with multiple accounts to train a model.

The dynamic notifier component 116 can apply weights to scores or values associated with properties or historic level of engagement to determine a score. The dynamic notifier component 116 can use the score to select a type of digital interface. For example, the existence of lack of a property can be represented as a numeric value. The historic level of engagement can be represented as a numeric value. The dynamic notifier component 116 can weight the scores (e.g., apply a multiplier to scores). The dynamic notifier component 116 can combine the scores (or weighted scores) to determine an overall score used to select a digital interface. The dynamic notifier component 116 can map the score to a type of digital interface. An example score based mapping is illustrated Table 2.

| Score Threshold | Type of Digital Interface |
| --- | --- |
| Less than 3 | Icon in corner of electronic resource |
| 3 to 5 | Banner in bottom of electronic resource |
| Greater than 5 and less than 7 | Conspicuously overlay interface over electronic resource |
| Greater than 7 | Voice-based interface |

Thus, the dynamic notifier component 116 can make a customized, dynamic selection of a type of digital interface based on real-time information associated with a property of a computing device 122 and a historic level of engagement with digital assistant in order to improve the computational efficiency with which the computing device 122, 3P electronic resource server 142, or remote data processing system 136 can execute tasks or functions associated with the electronic resource 112. For example, the data processing system 102 (e.g., via dynamic notifier component 116) can select the type of digital interface as a voice-based interface based on property of the client computing device 122 indicating the client computing device 122 includes a microphone and a speaker, and the historic level of engagement indicating a number of interactions between client computing devices 122 associated with the same account and the one or more digital assistants greater than a threshold (e.g., 7).

The dynamic notifier component 116 can generate a digital interface with the call-to-action. The dynamic notifier component 116 can generate the digital interface based on the type of digital interface selected based on the first property of the client computing device 122 and the historic level of engagement. The dynamic notifier component 116 can generate the digital interface responsive to the selection. The dynamic notifier component 116 can use, call, populate, or otherwise utilize a template, images, text, scripts, functions, user interface elements, audio, multimedia or other components to generate the digital interface. For example, the dynamic notifier component 116 can access a template for a digital interface, and populate fields in the template based on the call-to-action established by the 3P electronic resource server 142 for the electronic resource 112. In another example, the script library 114 can include pre-built or configured digital interfaces for each type of digital interface. The dynamic notifier component 116 can render the pre-built or pre-configured digital interface that corresponds to the selected type of digital interface for the call-to-action. In another example, the dynamic notifier component 116 can select the type of digital interface as a graphical user interface based on the first property of the client computing device 122 indicating the client computing device 122 lacks a microphone (or access to the microphone or a speaker of the client computing device 122 by the one or more digital assistants has been disabled). If the access to the microphone is disabled, then the dynamic notifier component 116 can select a type of digital interface that can receive non-voice-based input, such as touch input, or keyboard or mouse input.

The data processing system 102 can detect an instruction to execute the call-to-action. The instruction can be detected via an input device of the client computing device 122. The computing device 122 can receive the input via a touch interface, mouse input, keyboard input, voice input, gesture based input, or other type of input. The input can be an interaction with the digital interface, such selection of a button, link or other interactive widget presented via the interface. Thus, the data processing system 102 can detect, via the digital interface, an instruction to execute the call-to-action.

The data processing system 102 or script library 114 can include or execute a digital assistant selector component 120 designed, constructed and operational to determine a mode of execution for the call-to-action, select a digital assistant to execute the call-to-action, and transmit the call-to-action. The digital assistant selector component 120 can determine, responsive to the instruction to execute the call-to-action, a mode of execution for the call-to-action based on one or more properties of the client computing device 122 and the historic level of engagement. The mode of execution can refer to or include executing a native digital assistant on the computing device 122, or executing a non-native digital assistant on the computing device 122. A non-native digital assistant can refer to or include a digital assistant that is not pre-installed with an operating system. A non-native digital assistant can refer to a digital assistant that is installed as a third-party application on the computing device 122.

Modes of execution can include, for example: navigating to a non-native digital assistant application installed on the computing device 122; redirecting to the electronic resource with a prompt or indication to download and install the digital assistant; navigating to a native digital assistant installed on the computing device 122; navigating to the native digital assistant and immediately executing the call-to-action; navigating to a digital assistant electronic resource with a prompt indicating how to execute the call-to-action; providing a prompt with a list of other computing devices 122 having digital assistants that are linked to the same account as the computing device 122 executing the data processing system 102 and providing a prompt to select one of the other computing devices 122 to launch a digital assistant to execute the call-to-action.

The data processing system 102 can select the mode of execution for the call-to-action based on one or more properties of the client computing device indicating a type of operating system of the client computing device. The property used by the data processing system 102 to select the mode of execution can be referred to as a second property or a second one or more properties, while a property used to select the digital interface can be referred to as a first property or a first one or more properties. The first property can be the same as the second properties. A first one or more properties can overlap with a second one or more properties. The first property can be different from the second properties. A first one or more properties can be mutually exclusive from the second one or more properties.

To select the mode of execution, the digital assistant selector component 120 can use one or more function or technique similar to the dynamic notifier component 116. For example, the digital assistant selector component 120 can utilize a mapping technique, index, machine learning technique, logic-based technique, rules or policy.

The digital assistant selector component 120 can select a mode of execution based on the second property and historic level of engagement. The digital assistant selector component 120 can perform a lookup in a map or index with the second property and historic level of engagement to identify corresponding of mode of execution. The digital assistant selector component 120 can determine the mode of execution using a machine learning model or model trained with a machine learning technique. The model can include features such as properties, historic level of engagement, different modes of execution, and historic performance of a digital assistant or execution of an action with the corresponding mode of execution.

The digital assistant selector component 120 can select the mode of execution based on preferences associated with an account, or configuration provided by the 3P electronic resource server 142, or digital assistant server 138.

The digital assistant selector component 120 can select, based on the mode of execution, a digital assistant from the one or more digital assistants and a second client device of the plurality of client computing devices to execute the call-to-action. For example, the mode of execution can include launching, invoking, executing, or otherwise utilizing a digital assistant on a second computing device 122 (e.g., a computing device 122 that is different than the computing device 122 that initially loaded the electronic resource 112 and script library 114). The digital assistant selector component 120 can provide a list of available computing devices 122, and receive a selection of a computing device. The digital assistant selector component 120 can rank a list of computing devices 122 that are linked to the same account and configured or operational to launch a digital assistant to execute the call-to-action. The digital assistant selector component 120 can automatically select the highest ranking computing device 122, or receive an indication of a selection of a computing device.

For example, the list of computing devices 122 with digital assistants configured to execute the call-to-action can be ranked based on one or more of: how frequently the computing device 122 has been used to launch a digital assistant to execute a call-to-action; how recently the computing device 122 was last used; how close (location/proximity) the computing device 122 that initially loaded the script library 114 is to the other computing device 122; or how relevant the computing device 122 is to the call-to-action. For example, a digital assistant-enabled smart speaker computing device 122 is highly relevant to a call-to-action for playing music, whereas a smartwatch computing device 122 is less relevant to such a call-to-action. In another example, a digital assistant-enabled smart television is highly relevant to a call-to-action for playing a video, whereas a smartwatch computing device 122 is less relevant to such a call-to-action.

The digital assistant selector component 120 can select a second computing device 122 different from a first computing device (e.g., the computing device that initially loaded the script library 114) to execute the call-to-action. The digital assistant selector component 120 can transmit the call-to-action to the second client computing device 122 to cause the second client computing device 122 to invoke the digital assistant to execute the call-to-action. The digital assistant selector component 120 can transmit information that facilitate executing the call-to-action, such as information associated with the electronic resource 112, or an account associated with the electronic resource 112. The information can include a reference, pointer, metadata, location information, or other data that facilitates executing the call-to-action by the digital assistant of the second computing device 122.

In some cases, the system 100 can select digital components for provision. The system can select content items or digital components from 3P digital content provider devices 134. The system 100 can provide the selected digital component for presentation via the computing device 122, on the electronic resource 112, with the digital interface, or on the second computing device 122 that executes the call-to-action. The content item or digital component can be selected based on the electronic resource 112, properties, historic level of engagement, call-to-action, or other information.

For example, the remote data processing system 136 can include a content selector component 140. The content selector component 140 of the remote data processing system 136 can select content items (e.g., digital component objects). The content selector component 140 can select content items based on or responsive to one or more of a: request for content, based on the dynamic notifier component 116 selecting a digital interface, based on the digital assistant selector component 120 selecting a mode of execution or computing device 122, based on the call-to-action, or based on transmission of a call-to-action based on the request or responsive to the request. The content selector component 140 can select a content item that is relevant or otherwise matches information associated with the call-to-action. For example, if the application is an e-commerce application that sells shoes, then the content selector component 140 can select a content item for a type of sneaker. In another example, if the call-to-action relates to booking a flight, then the remote data processing system 136 can select a content item related to travel (e.g., a coupon for a flight).

In some cases, the content selector component 140 of the remote data processing system 136 can determine to select a content item (e.g., a digital component object) provided by a 3P digital content provider device 134 subsequent to the dynamic notifier component 116 of the data processing system 102 selecting a type of digital interface. Subsequent to the dynamic notifier component 116 selecting a type of digital interface, the dynamic notifier component 116 can provide an indication of the selected type of digital interface to the remote data processing system 136. The dynamic notifier component 116 can provide the indication to the digital assistant server 138. The digital assistant server 138 can generate a request for a content item and forward the request to the content selector component 140. The digital assistant server 138 can generate the request for content responsive to receiving the indication of the selection of the type of digital interface. In some cases, the digital assistant server 138 can determine to generate the request for content based on the type of digital interface the dynamic notifier component 116 generated. For example, if the dynamic notifier component 116 selects a prominent or conspicuous interface that occupies more screen real-estate, then the digital assistant server 138 can determine that there may be sufficient room to include a content item. Therefore, the digital assistant server 138, responsive to the determination there is sufficient screen space for a supplemental content item, can generate the request for content. However, if the selected type of digital interface is more inconspicuous, such as a small icon in the corner of the screen, then the digital assistant server 138 can determine to not generate a request for content, thereby reducing wasted computing resource utilization.

Upon generating the request for content, the digital assistant server 138 can forward the request for content to the content selector component 140. The content selector component 140 can perform a real-time content selection process to select a content item. The content selector component 140 can use one or more parameters or selection criteria to select the content item. For example, the request received by the content selector component 140 can include information about the electronic resource 112 (e.g., keywords, topics, concepts, or other contextual information), the call-to-action to be provided in a digital interface, the selected type of digital interface, or information associated with an electronic account. The content selector component 140 can use the information to select a relevant content item.

The remote data processing system 136 can provide the selected content item to the data processing system 102 for presentation. The remote data processing system 136 can provide the content item to the script library 114 to cause the script library 114 to display or present the content item via the digital interface selected by the dynamic notifier component 116. The dynamic notifier component 116 can display the content item along with the call-to-action presented via the digital interface. Thus, the real-time content selection process can occur subsequent to selecting the type of digital interface and prior to presenting the digital interface for display.

In some cases, the data processing system 102 can present the content item via the digital assistant component 106. The remote data processing system 136 can provide the selected content item to the application 110 for presentation. The remote data processing system 136 can provide the selected content item to the digital assistant component 106 to provide to the application 110 for presentation. The content item can be presented via the user interface of the application 110, such as in a visual content slot or audio output. The dynamic notifier component 116 can provide or present the content item along with the selected digital interface. The digital assistant selector component 120 can provide the content item to the second computing device 122 selected for executing the call-to-action to cause the second computing device 122 to present the content item.

The digital assistant component 106 can present the content item separately or independently from the application 110. For example, the digital assistant component 106 can invoke a separate user interface, such as a pop-up window or banner content for display via the display device 128 of the computing device 122. In some cases, the digital assistant component 106 can provide the content item as audio output. The audio output can be presented prior to, during, or subsequent to audio output of the application 110. In the event the application 110 is not providing audio output, the digital assistant component 106 can provide the content item via audio output independent of the interface used by the application. Thus, the data processing system 102 can present the content item via a user interface of the digital assistant component 106 (e.g., an audio interface) or the application 110 (e.g., a graphical user interface).

In some cases, the remote data processing system 136 can transmit the selected content item to a second computing device 122 different from the computing device 122 that initially loaded the electronic resource 112. For example, the remote data processing system 136 can receive an indication from the digital assistant selector component 120 that identifies the second computing device 122. The digital assistant selector component 120 can select the second computing device 122 to execute the call-to-action provided via the digital interface. Thus, rather than present the selected content item via the computing device 122, the system 100 can present the content item via the second computing device 122 that executes the call-to-action.

To do so, and in some cases, the remote data processing system 136 can transmit the content item to the data processing system 102, and the data processing system 102 can determine to delay presentation of the content item until the digital assistant selector component 120 selects a digital assistant of a second computing device 122 to execute the call-to-action. Upon selecting a digital assistant of the second computing device 122, the data processing system 102 can forward the selected content item to the corresponding second computing device 122 along with the call-to-action for execution.

In some cases, the data processing system 102 can present the content item along with the digital interface, and then transmit the content item to the selected digital assistant of the second computing device 122 to cause the second computing device 122 to redisplay the selected content item or a related content item.

Figure 2:
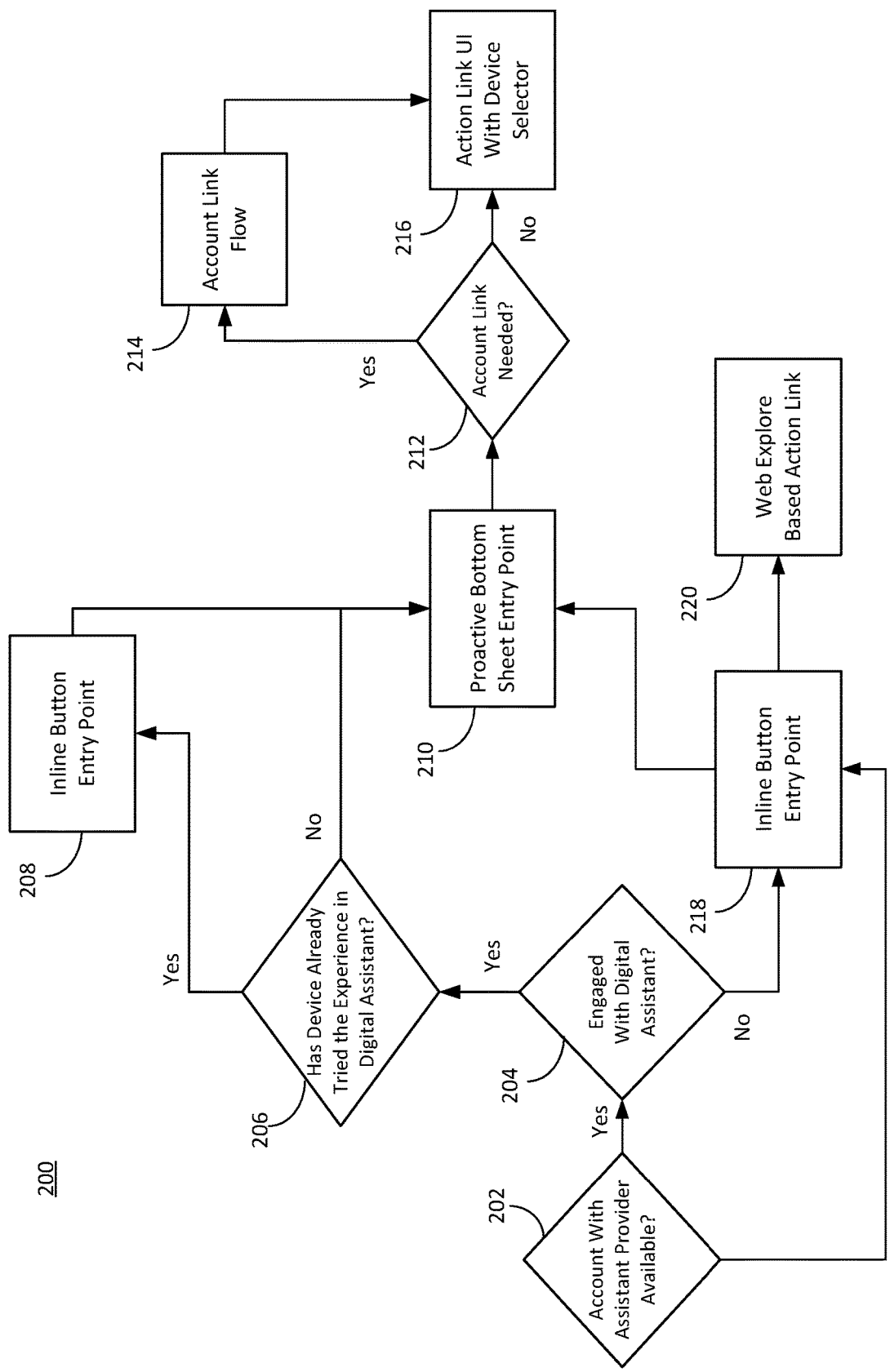
FIG. 2 is an illustration of a process to adjust execution of digital actions, in accordance with an implementation.

FIG. 2 is an illustration of a process to adjust execution of digital actions, in accordance with an implementation. The process 200 can be performed by one or more system or component depicted in FIG. 1 or FIG. 7, including, for example, the data processing system, remote data processing system, local digital assistant, script library, dynamic notifier component, or digital selector component. The method 200 can initiate by inspecting whether or an account has been activated for the session. If an account has not been activated, then the data processing system can determine it may not be possible to dynamically select a digital interface because it may not be possible to determine the historic level of engagement. Accordingly, the data processing system can select a default digital interface if an account is not active or logged in for the session. The default digital interface, when selected, can generate a prompt to request account login credentials.

If an account is logged-in, the script library can inspect whether or not the account has engaged with a digital assistant by (1) communicating with a digital assistant server to confirm whether or not there are any assistant-enabled devices associated with the account, or (2) whether the account has completed a digital assistant onboarding experience in the past. If the account is not an Assistant user, they the script library can select the same default, non-customized digital interface button as if the account was not logged in because there is no signal with regard to historical level of engagement that can be used to dynamically select a digital interface that is more prominent. If, however, the account is logged-in and the account has historically engaged with a digital assistant, then the library can inspect whether/not there exist any past interactions between the user and the third-party electronic resource provider via a digital assistant that associated with the account. The script library can determine the historic level of engagement with a digital assistant to perform an action on the electronic resource by querying a digital assistant server.

If the account has not interacted with the electronic resource using the digital assistant in the past (e.g., if logged interactions between the electronic resource and a digital assistant associated with the account does not exist in the past), then the script library can select the same non-personalized default digital interface button, as there is no signal (either positive or negative) as to whether they may benefit from more a more prominent call-to-action for digital assistant voice functions.

If the account is signed in, the account has engaged with a digital assistant, and the account has engaged with the digital assistant to interact with or perform an action on the electronic resource, the script library can determine to show a more prominent call-to-action for digital assistant voice functions on the electronic resource.

For example, at ACT 202, the data processing system executing the script library can determine whether there is an account with an assistant provider available. The account is not available (e.g., not signed in), then the script library can proceed to ACT 218 to display a default digital interface that is not customized for the inline button entry point, and then proceed to ACT 220 to provide a web explore based action link such as a link with information about digital assistants, as well as ACT 210 to provide a proactive bottom sheet entry point. If, however, at ACT 202 the script library determines that an account associated with a digital assistant is logged in for the session (e.g., via an operating system of a computing device, application, or electronic resource), the script library (or system executing the script library) can proceed to ACT 204 to determine whether the account has engaged with a digital assistant. At ACT 204, the script library can determine a historic level of engagement with the account. The script library can determine whether the account has used digital assistants in the past.

If, at ACT 204, the script library determines that the account has not used digital assistants in the past, then the script library can proceed to ACT 218 to select the default digital interface for the inline button entry point. If the script library determines at ACT 204 that the account has engaged with digital assistants, the script library can proceed to ACT 206 to determine whether the account (or computing device 122 on which the account is logged in) has used a digital assistant for the electronic resource to execute the call-to-action. If, at ACT 206, the script library determines that the user has previously used the digital assistant to execute an action for the electronic resource, the script library can proceed to ACT 208 to select a digital interface that corresponds to this level of engagement and based on a property of the device, and then proceed to ACT 210. If, at ACT 206, the script library determines that the account has not used a digital assistant to execute an action for the electronic resource, the script library can proceed to ACT 210 to provide a proactive bottom sheet entry point.

At ACT 210, the script library can provide a proactive bottom sheet entry point, which can include determining a mode of execution for the digital assistant. The script library can determine to provide a more prominent digital interface. The script library can proceed to ACT 212 to determine whether an account link to the electronic resource is needed. The account link can link the digital assistant to the electronic resource to facilitate the digital assistant executing an action associated with the electronic resource. The script library can determine whether an account link is needed based on the type of action to be executed (e.g., a purchase). If, at ACT 212, the script library determines that an account link is needed, the script library can proceed to ACT 214 to execute an account link flow, which can include a prompt for account credentials or a request to link an account of the electronic resource with the digital assistant, and then proceed to ACT 216. If the script library determines at ACT 212 that an account link is not needed, the script library can proceed to ACT 216 to provide an action link user interface with a device selector. The script library can rank available devices that are configured with a digital assistant to execute the action, and receive a selection of the device to use to execute the action. In some cases, the script library can automatically select a highest ranking device to execute the action.

Figure 3:
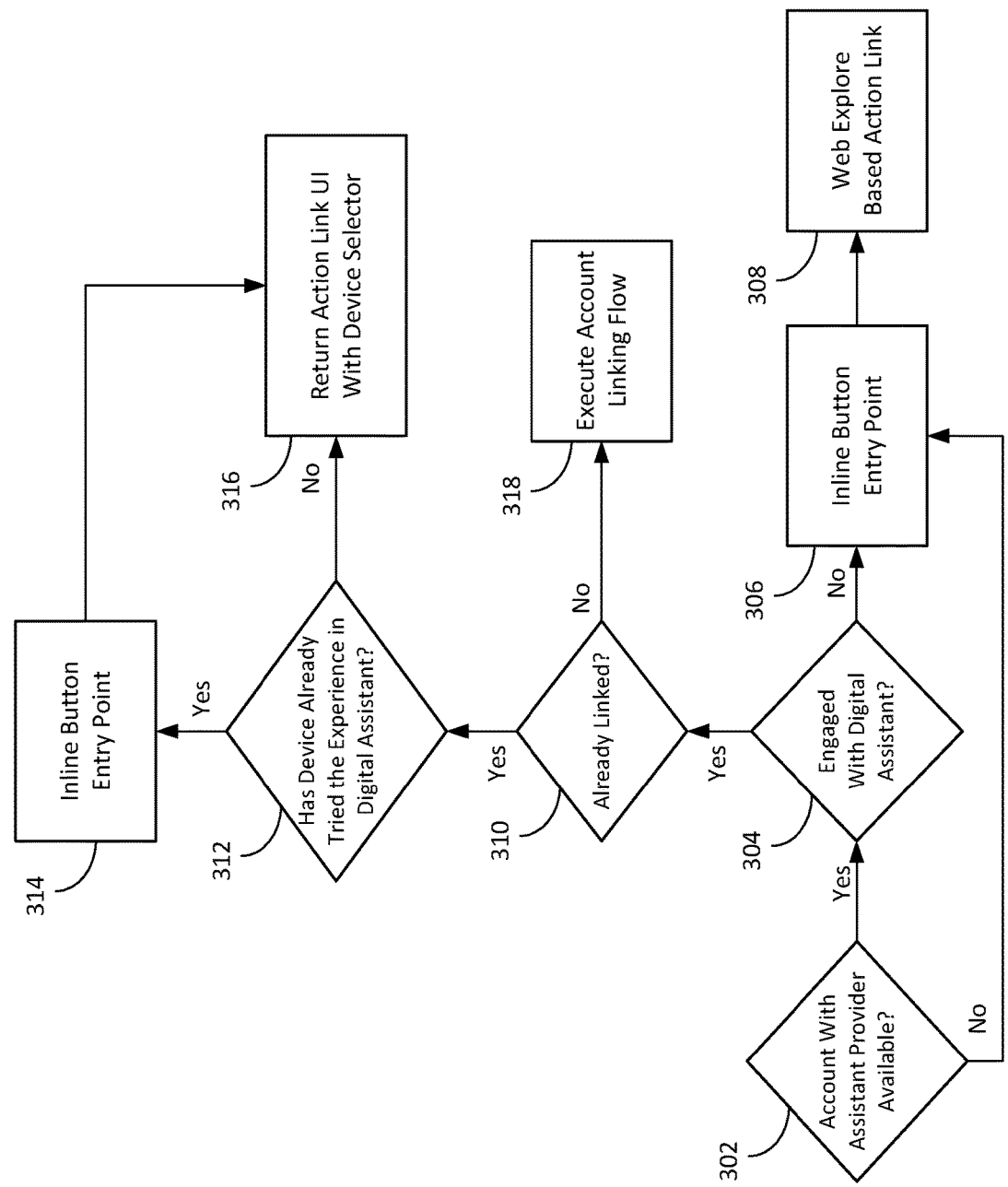
FIG. 3 is an illustration of a process to adjust execution of digital actions, in accordance with an implementation.

FIG. 3 is an illustration of a process to adjust execution of digital actions, in accordance with an implementation. The process 300 can be performed by one or more system or component depicted in FIG. 1 or FIG. 7, including, for example, the data processing system, remote data processing system, local digital assistant, script library, dynamic notifier component, or digital selector component. The process 300 can be used for devices that already have linked accounts. For example, at ACT 302, the script library can determine whether an account with a digital assistant provider is available. The script library can determine whether a digital assistant account is activated or logged in for the session, such as in an application, operating system, or device. If, at ACT 302, the script library determines that an account with a digital assistant is not logged in or available, the script library can proceed to ACT 306 to select and provide an inline button entry point. The script library can provide a default digital interface for the call-to-action that is not customized. The script library can proceed to ACT 308 to provide a web explore based action link, which can refer to or include a link to an electronic resource.

If, however, at ACT 302 the script library determines a digital assistant account is logged in, the script library can proceed to ACT 304 to determine a historic level of engagement with digital assistants. If the account has not historically engaged with digital assistants, or has a low level of engagement with the digital assistants that is below a threshold (e.g., it has been more than 3 months since the account engaged with a digital assistant), then the script library can proceed to ACT 306 to provide a default, non-customized digital interface.

If, at ACT 304, the script library determines the account has engaged with digital assistants, or has engaged beyond a threshold, then the script library can proceed to ACT 310 to determine whether an account of the electronic resource is already linked with the account of the digital assistant. The script library can determine whether a digital assistant account is linked to an account of a 3P electronic resource or 3P electronic resource server. If a digital assistant account is not linked to an account of the electronic resource, then the script library can proceed to ACT 318 to execute an account linking flow.

If, however, at ACT 310 the script library determines that the digital assistant account is linked to an electronic resource account (e.g., account of a travel website, music service, or online marketplace), then the script library can proceed to ACT 312 to determine whether the device or account has already used the digital assistant to execute the call-to-action for the electronic resource. If the script library determines at 312 that the device has not used digital assistant to execute the action for the electronic resource, then the script library can proceed to ACT 316 to return an action link user interface ("UP") with a device selector. If, however, the script library determines that digital assistants have been used to execute actions for the electronic resource, then the script library can proceed to ACT 314 to select an inline button entry point, which can be a customized or personalized digital interface that is prominently displayed with a call-to-action for a digital assistant. The script library can select a more prominent digital interface based the account being linked and previously used to execute an action for the electronic resource. The script library can then proceed to ACT 318 to provide an action link UI with a device selector. The script library can rank the available devices for selection, or automatically select the highest ranking device.

Figure 4:
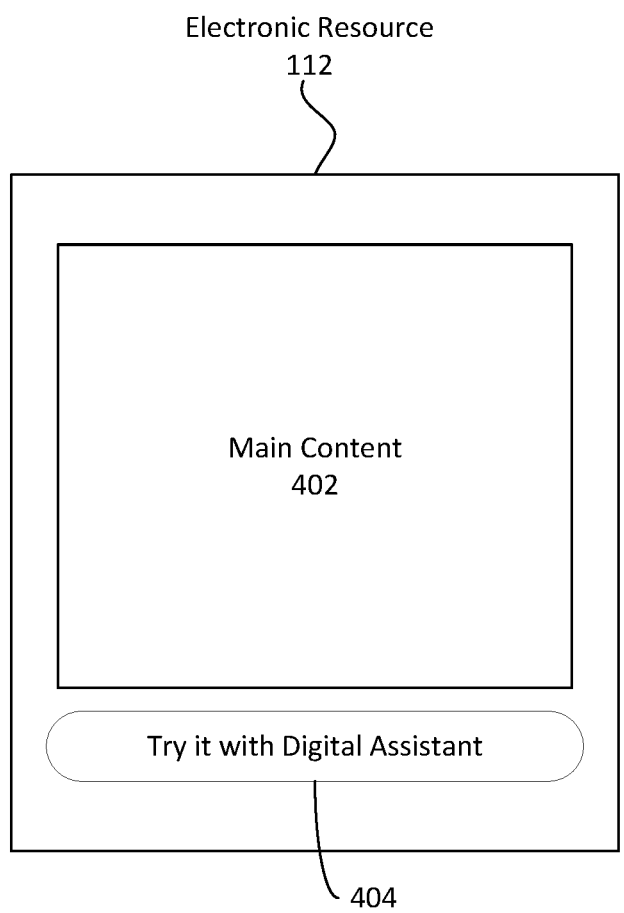
FIG. 4 is an illustration of a graphical user interface for execution of digital actions, in accordance with an implementation.

FIG. 4 is an illustration of a graphical user interface for execution of digital actions, in accordance with an implementation. The graphical user interface 400 can be provided by one or more system or component depicted in FIG. 1 or FIG. 7, including, for example, the data processing system, remote data processing system, local digital assistant, script library, dynamic notifier component, digital selector component, or display device. The graphical user interface 400 can include an electronic resource 112, main content 402 and an icon or inline entry point button 404. The main content 402 can include or refer to text, images, multimedia content or other content that is provided by the provider of the electronic resource 112. The icon 404 can be an example of a digital interface type, and can include an inline button entry point with a prompt, such as "try it with digital assistant." A script library can select the button 404 based on detecting that a digital assistant account is not logged in (e.g., via processes 200 or 300). The script library can display the icon 404 below the main content 402 so as not to obfuscate or otherwise block the main content 402.

Figure 5:
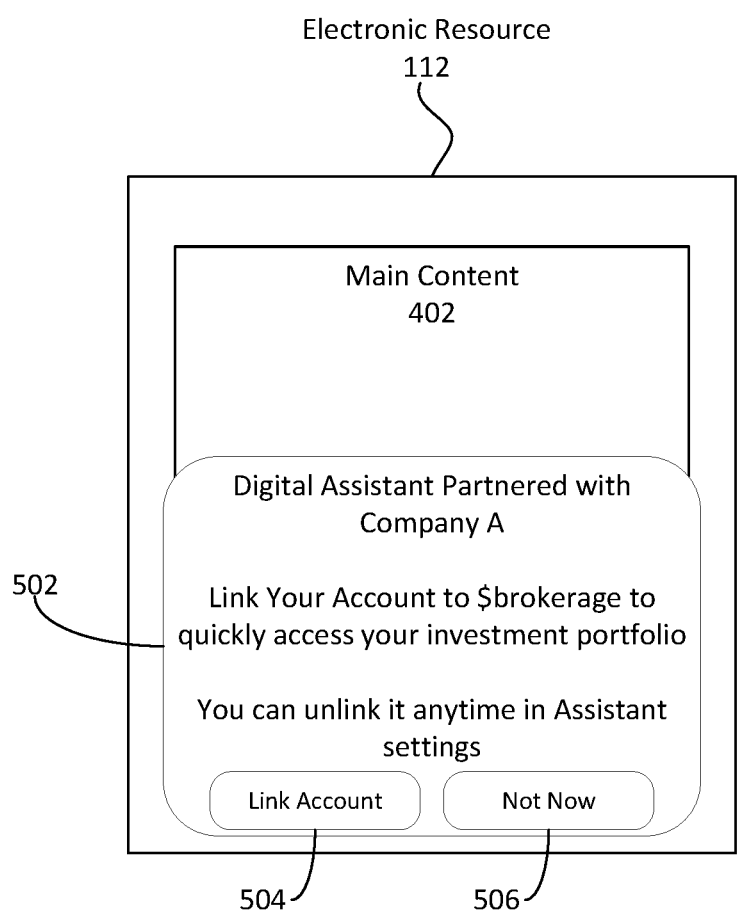
FIG. 5 is an illustration of a graphical user interface for execution of digital actions, in accordance with an implementation.

FIG. 5 is an illustration of a graphical user interface for execution of digital actions, in accordance with an implementation. The graphical user interface 500 can be provided by one or more system or component depicted in FIG. 1 or FIG. 7, including, for example, the data processing system, remote data processing system, local digital assistant, script library, dynamic notifier component, digital selector component, or display device. The graphical user interface 500 can include a display of the electronic resource 112, main content 402, a pop-up window 502, with buttons to link an account 504 or not link an account 506. The graphical user interface 500 can be provided via processes 300 or 400.

The pop-up window can be a digital interface and correspond to a type of digital interface selected by the script library based on properties and a historic level of engagement. The script library can select, generate and provide the pop-up window 502 responsive to determining that a digital assistant account is logged in, that the account has previously engaged with the digital assistant, but the account of the electronic resource provider is not linked with the digital assistant provider. For example, the script library can determine based on the historic level of engagement and properties of the device to select a digital interface type with a call-to-action that is more prominent. For example if the first property indicates the client computing device is a smartphone enabled with the digital assistant, and the historic level of engagement indicates that computing devices interacted with the one or more digital assistants during a time interval prior to the script library loaded by the data processing system for the electronic resource, then then the script library can select the digital interface having a pop-up icon 502 overlaid on the electronic resource 112. The pop-up window 502 is more prominent that the icon 404 depicted in FIG. 4 because the pop-up window 502 blocks a portion of the main content 402 of the electronic resource 112 (e.g., half of the main content 402). The script library can determine to provide a more prominent digital interface type. The link account button 504 can execute an account linking flow, as depicted in processes 200 and 300.

Figure 6:
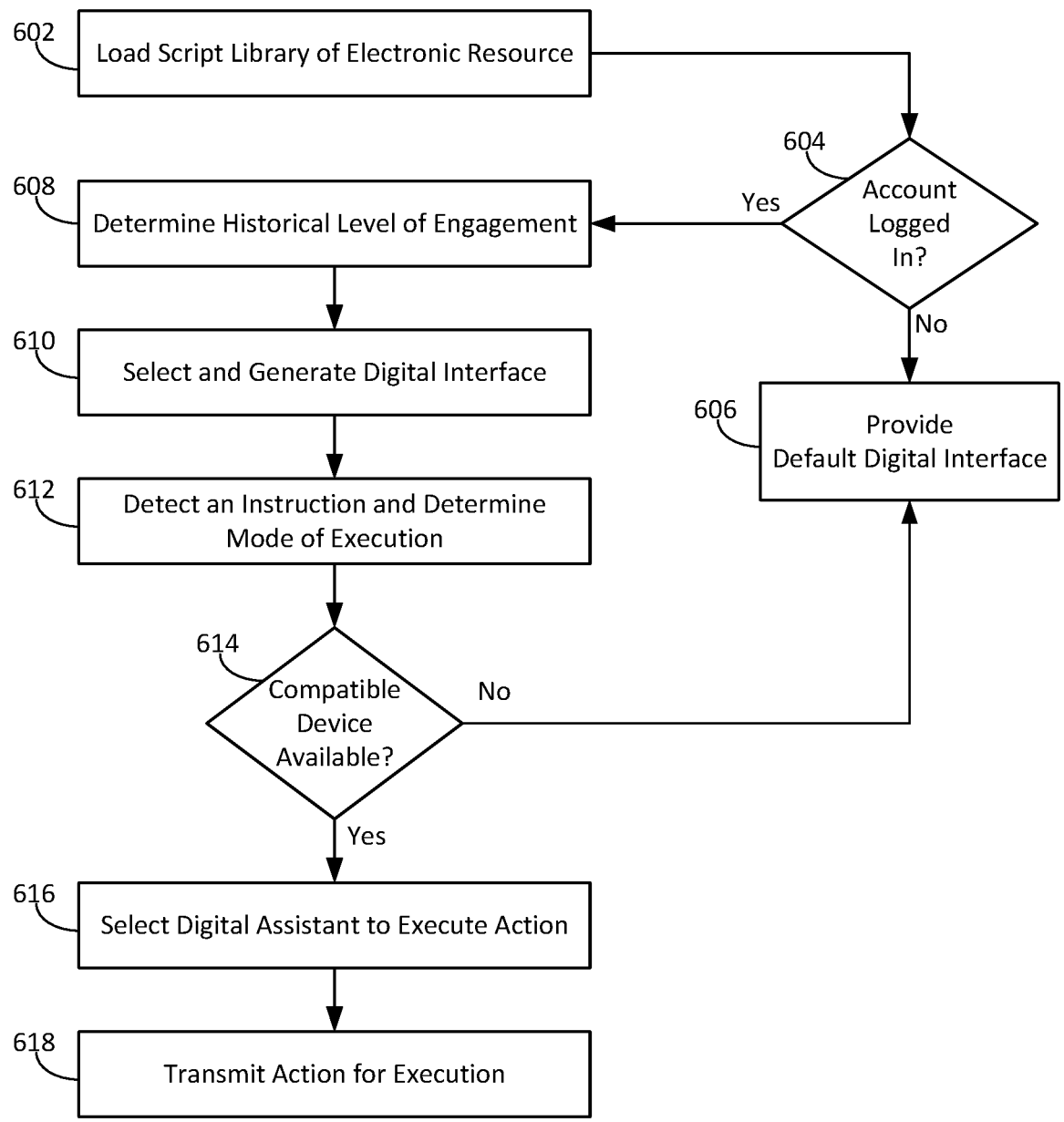
FIG. 6 is an illustration of a method of adjusting execution of digital actions, in accordance with an implementation.

FIG. 6 is an illustration of a method of adjusting execution of digital actions, in accordance with an implementation. The method 600 can be performed by one or more system or component depicted in FIG. 1 or FIG. 7, including, for example, the data processing system, remote data processing system, local digital assistant, script library, dynamic notifier component, or digital selector component.

At 602, the method 600 can include a computing device or data processing system loading a script library of or embedded in an electronic resource. The script library can be embedded in a webpage provided by a web server. The data processing system or device can execute the script library in an inline frame of the electronic resource. The script library can include one or more call-to-actions, components, or modules. The data processing system can load, via a client computing device linked to an electronic account of a digital assistant, the script library embedded in an electronic resource. The script library can include multiple call-to-actions for the electronic resource that are configured for execution by one or more digital assistants provided client computing devices.

At 604, the script library can determine whether a digital assistant account is logged in for the session (e.g., currently logged in on the device). The script library can query an application or operating system of the device to determine whether the digital assistant account is active, activated or otherwise logged in. If the script library determines the digital assistant account is not active or logged in, the script library can proceed to ACT 606 to provide a default digital interface for the call-to-action that is not customized or configured for a digital assistant to execute.

If, however, at ACT 604 the script library determines that the digital assistant account is active, then the script library can proceed to ACT 608. At 608, the script library can determine a historic level of engagement. The script library can query a digital assistant server to determine a historic level of engagement between the account and digital assistants. The script library can query the digital assistant server to determine an historic level of engagement between the client computing devices linked to the electronic account and the one or more digital assistants.

At 610, the script library can select and generate a digital interface based on the historic level of engagement between the account and digital assistant. The script library can select the digital interface based on a first property of the client computing device and the historic level of engagement. The script library can provide the call-to-action via the digital interface.

At 612, the script library can detect an instruction to execute the call-to-action, and determine a mode of execution for the call-to-action. The script library can determine, responsive to the instruction to execute the call-to-action, a mode of execution for the call-to-action based on a second property of the client computing device and the historic level of engagement. The mode of execution can be, for example, to launch a native digital assistant or a 3P provided digital assistant.

At ACT 614, the script library can determine whether there are any compatible devices available. The script library can identify available digital assistant-enabled devices. If the script library is unable to identify any digital assistant-enabled devices that are currently available, then the script library can proceed to ACT 606 to provide a default digital interface. For example, the mode of execution can be to use a native digital assistant, but the client device may not have a native digital assistant installed. In another example, the mode of execution can be to use a third party provided digital assistant, but the current client device may not have the third party digital assistant installed, and a second linked device may be offline or not located proximate to the first computing device.

If, however, the script library identifies available digital assistant enabled devices that can execute the call-to-action via the selected mode of execution, then the script library can proceed to ACT 616. At ACT 616, the script library can select a digital assistant to execute the call-to-action. The script library can select a second computing device based on one or more properties and the historic level of engagement. For example, the script library can select a digital assistant configured on a second computing device that was recently used to execute a similar call-to-action and located proximate (e.g., on the same WIFI network) as the first computing device. At ACT 618, the script library can transmit the call-to-action to the selected second computing device to cause the digital assistant of the second computing device to execute the call-to-action.

Figure 7:
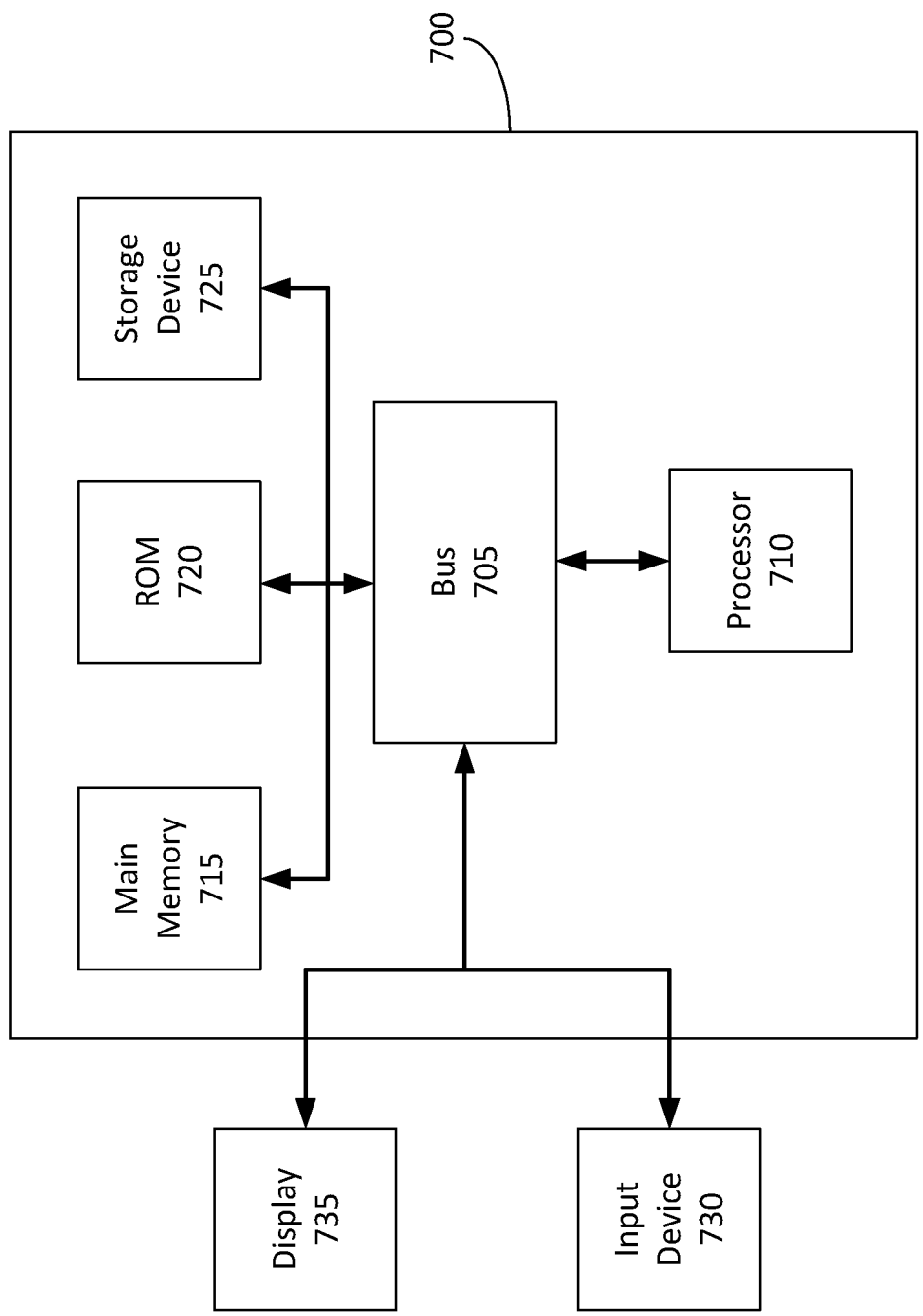
FIG. 7 is a block diagram illustrating a general architecture for a computer system that can be employed to implement elements of the system depicted in FIG. 1, the processes and methods depicted in FIGS. 2, 3 and 6, and the graphical user interface elements depicted in FIGS. 4 and 5.

FIG. 7 is a block diagram of an example computer system 700. The computer system or computing device 700 can include or be used to implement the system 100, or its components such as the data processing system 102. The computing system 700 includes a bus 705 or other communication component for communicating information and a processor 710 or processing circuit coupled to the bus 705 for processing information. The computing system 700 can also include one or more processors 710 or processing circuits coupled to the bus for processing information. The computing system 700 also includes main memory 715, such as a random access memory (RAM) or other dynamic storage device, coupled to the bus 705 for storing information, and instructions to be executed by the processor 710. The main memory 715 can be or include a data repository. The main memory 715 can also be used for storing position information, temporary variables, or other intermediate information during execution of instructions by the processor 710. The computing system 700 may further include a read only memory (ROM) 720 or other static storage device coupled to the bus 705 for storing static information and instructions for the processor 710. A storage device 725, such as a solid state device, magnetic disk or optical disk, can be coupled to the bus 705 to persistently store information and instructions. The storage device 725 can include or be part of the data repository.

The computing system 700 may be coupled via the bus 705 to a display 735, such as a liquid crystal display, or active matrix display, for displaying information to a user. An input device 730, such as a keyboard including alphanumeric and other keys, may be coupled to the bus 705 for communicating information and command selections to the processor 710. The input device 730 can include a touch screen display 735. The input device 730 can also include a cursor control, such as a mouse, a trackball, or cursor direction keys, for communicating direction information and command selections to the processor 710 and for controlling cursor movement on the display 735. The display 735 can be part of the data processing system 102, the client computing device 122 or other component of FIG. 1, for example.

The processes, systems and methods described herein can be implemented by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement may also be employed to execute the instructions contained in main memory 715. Hard-wired circuitry can be used in place of or in combination with software instructions together with the systems and methods described herein. Systems and methods described herein are not limited to any specific combination of hardware circuitry and software.

Although an example computing system has been described in FIG. 7, the subject matter including the operations described in this specification can be implemented in other types of digital electronic circuitry, or in computer software, firmware, or hardware, including the structures disclosed in this specification and their structural equivalents, or in combinations of one or more of them.

In situations in which the systems described herein collect personal information about users or applications installed on a user device, or make use of personal information, the users are provided with an opportunity to control whether programs or features collect user information (e.g., information about a user's social network, social actions, or activities, profession, a user's preferences, or a user's current location). In addition or in the alternative, certain data can be treated in one or more ways before it is stored or used, so that personal information is removed.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The digital assistant component 106, and other data processing system 136 components can include or share one or more data processing apparatuses, systems, computing devices, or processors. The digital assistant server 138 and content selector component 140 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 700 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the digital assistant server 138 from the digital assistant component 106 of the computing device 122 or the 3P digital content provider device 134).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the dynamic notifier component 116, and the digital assistant selector component 120 can be a single component, app, or program, or a logic device having one or more processing circuits, or executed by one or more processors of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation.

Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, devices, products or services described as 3P or third party such as the 3P digital content provider device 134 can be or include, partially or entirely, first party devices, products or services, and can be commonly owned by an entity associated with the data processing system 102, the digital assistant server 138, or other components. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to adjust execution of digital actions, comprising:

a data processing system comprising one or more processors to:

load, via a client computing device of a plurality of client computing devices linked to an electronic account, a script library embedded in an electronic resource, the script library comprising a plurality of call-to-actions for the electronic resource configured for execution by one or more digital assistants, wherein at least one of the one or more digital assistants is provided by each of the plurality of client computing devices;

determine an historic level of engagement between the plurality of client computing devices and the one or more digital assistants;

select, based on a first property of the client computing device and the historic level of engagement, a type of digital interface in which to present a call-to-action of the plurality of call-to-actions;

generate, based on the type of digital interface selected based on the first property of the client computing device and the historic level of engagement, a digital interface with the call-to-action;

receive, from a remote data processing system, a content item from a third-party content provider selected by the remote data processing system via a real-time content selection process;

present the content item via the digital interface;

detect, via the digital interface, an instruction to execute the call-to-action;

determine, responsive to the instruction to execute the call-to-action, a mode of execution for the call-to-action based on a second property of the client computing device and the historic level of engagement;

select, based on the mode of execution, a digital assistant from the one or more digital assistants and a second client computing device of the plurality of client computing devices to execute the call-to-action; and transmit the call-to-action to the second client computing device to cause the second client computing device to invoke the digital assistant to execute the call-to-action.

2. The system of claim 1, wherein the remote data processing system selects the content item based on the electronic resource.

3. The system of claim 1, wherein the remote data processing system selects the content item based on the historic level of engagement.

4. The system of claim 1, wherein the remote data processing system selects the content item based on the first property.

5. The system of claim 1, wherein the remote data processing system selects the content item based on the mode of execution.

6. The system of claim 1, wherein the remote data processing system transmits the content item to the second client computing device for presentation.

7. The system of claim 1, wherein the remote data processing system:

selects a second content item based on the second property associated with the second client computing device; and transmits the second content item to the second client computing device for presentation.

8. The system of claim 1, wherein the script library is established by a third-party service provider with the plurality of call-to-actions comprising a predetermined set of call-to-actions selected by the third-party service provider.

9. The system of claim 1, comprising:

the data processing system to select the type of digital interface comprising a voice-based interface based on the first property of the client computing device indicating the client computing device comprises a microphone and a speaker, and the historic level of engagement indicating a number of interactions between the plurality of client computing devices and the one or more digital assistants greater than a threshold, and wherein the remote data processing system selects the content item based on the digital interface comprising the voice-based interface selected by the data processing system.

10. The system of claim 1, wherein the first property indicates the client computing device is a smartphone enabled with the digital assistant, and the historic level of engagement indicates that the plurality of client computing devices interacted with the one or more digital assistants during a time interval prior to the script library loaded by the data processing system for the electronic resource, comprising:

the data processing system to select the digital interface comprising a pop-up icon overlaid on the electronic resource, and wherein the remote data processing system selects the content item based on the digital interface comprising the pop-up icon selected by the data processing system.

11. A method of adjusting execution of digital actions, comprising:

loading, by a data processing system comprising one or more processors, via a client computing device of a plurality of client computing devices linked to an electronic account, a script library embedded in an electronic resource, the script library comprising a plurality of call-to-actions for the electronic resource configured for execution by one or more digital assistants wherein at least one of the one or more digital assistants is provided by each of the plurality of client computing devices;

identifying, by the data processing system, an historic level of engagement between the plurality of client computing devices and the one or more digital assistants;

selecting, by the data processing system based on a first property of the client computing device and the historic level of engagement, a type of digital interface in which to present a call-to-action of the plurality of call-to-actions;

generating, by the data processing system based on the type of digital interface selected based on the first property of the client computing device and the historic level of engagement, a digital interface with the call-to-action;

receiving, from a remote data processing system, a content item selected via a real-time content selection process, the content item provided by a third-party content provider;

presenting, by the data processing system, the content item via the digital interface;

detect, via the digital interface, an instruction to execute the call-to-action;

determine, responsive to the instruction to execute the call-to-action, a mode of execution for the call-to-action based on a second property of the client computing device and the historic level of engagement;

select, based on the mode of execution, a digital assistant from the one or more digital assistants and a second client computing device of the plurality of client computing devices to execute the call-to-action; and transmit the call-to-action to the second client computing device to cause the second client computing device to invoke the digital assistant to execute the call-to-action.

12. The method of claim 11, comprising:

selecting, by the remote data processing system, the content item based on the electronic resource.

13. The method of claim 11, comprising:

selecting, by the remote data processing system, the content item based on the historic level of engagement.

14. The method of claim 11, comprising:

selecting, by the remote data processing system, the content item based on the first property.

15. The method of claim 11, comprising:

selecting, by the remote data processing system, the content item based on the mode of execution.

16. The method of claim 11, comprising:

transmitting, by the remote data processing system, the content item to the second client computing device for presentation.

17. The method of claim 11, comprising:

selecting, by the remote data processing system, a second content item based on the second property associated with the second client computing device; and transmitting, by the remote data processing system, the second content item to the second client computing device for presentation.

18. The method of claim 11, wherein the script library is established by a third-party service provider with the plurality of call-to-actions comprising a predetermined set of call-to-actions selected by the third-party service provider.

19. The method of claim 11, comprising:
   selecting, by the data processing system, the type of digital interface comprising a voice-based interface based on the first property of the client computing device indicating the client computing device comprises a microphone and a speaker, and the historic level of engagement indicating a number of interactions between the plurality of client computing devices and the one or more digital assistants greater than a threshold; and
   selecting, by the remote data processing system, the content item based on the digital interface comprising the voice-based interface selected by the data processing system.

20. The method of claim 11, wherein the first property indicates the client computing device is a smartphone enabled with the digital assistant, and the historic level of engagement indicates that the plurality of client computing devices interacted with the one or more digital assistants during a time interval prior to the script library loaded by the data processing system for the electronic resource, comprising:
   selecting, by the data processing system, the digital interface comprising a pop-up icon overlaid on the electronic resource; and
   selecting, by the remote data processing system, the content item based on the digital interface comprising the pop-up icon selected by the data processing system.

* * * * *